(12) United States Patent
Sasai et al.

(10) Patent No.: US 7,349,634 B2
(45) Date of Patent: Mar. 25, 2008

(54) OPTICAL TRANSMISSION SYSTEM FOR RADIO ACCESS AND HIGH FREQUENCY OPTICAL TRANSMITTER

(75) Inventors: Hiroyuki Sasai, Katano (JP); Masaru Fuse, Toyonaka (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 0 days.

(21) Appl. No.: 11/600,740

(22) Filed: Nov. 17, 2006

(65) Prior Publication Data

US 2007/0058975 A1 Mar. 15, 2007

Related U.S. Application Data

(62) Division of application No. 09/892,605, filed on Jun. 28, 2001, now abandoned.

(30) Foreign Application Priority Data

Jun. 29, 2000 (JP) ............................. 2000-197083
Sep. 6, 2000 (JP) ............................. 2000-269804
Nov. 16, 2000 (JP) ............................. 2000-349874

(51) Int. Cl.
  *H04B 10/00* (2006.01)
  *H04J 14/00* (2006.01)
(52) U.S. Cl. ............................. 398/115; 398/69; 398/71
(58) Field of Classification Search ............ 398/68–72, 398/115, 116
  See application file for complete search history.

(56) References Cited

U.S. PATENT DOCUMENTS 5,422,966 A 6/1995 Gopalakrishnan et al.
6,201,820 B1 * 3/2001 Palmer ........................ 372/32
6,362,913 B2 3/2002 Ooi et al.
6,525,857 B1 2/2003 Way et al.
2003/0035183 A1 * 2/2003 Seto et al. ................... 359/173
2004/0190911 A1 9/2004 Frano et al.

FOREIGN PATENT DOCUMENTS

JP 5-244119 9/1993
JP 6-268590 9/1994
JP 9-236781 9/1997
JP 10-200484 7/1998

OTHER PUBLICATIONS

"Wavelength Multiplexing Optical Semiconductor Component" by Yoshikuni et al., magazine "O Plus E", Nov. 1997.
"Full-Duplex Fiber-Optic RF Subcarrier Transmission Using a Dual-Function Modulator/Demodulator" by Andreas Stohr et al., IEEE Trans, Microwave Theory Tech., vol. 47, No. 7, 1999.

* cited by examiner

*Primary Examiner*—Shi K. Li
*Assistant Examiner*—Nathan Curs
(74) *Attorney, Agent, or Firm*—Wenderoth, Lind & Ponack, L.L.P.

(57) ABSTRACT

Modulators respectively modulate baseband signals into IF signals having different frequencies. Multiplexers multiplex the IF signals. A local oscillation signal source outputs a predetermined local oscillation signal. An external modulator intensity-modulates an optical signal using the local oscillation signal. An optical branching portion branches the intensity-modulated optical signal. Modulators respectively modulate the multiplexed IF signals onto the branched optical signals and then output the optical signals to radio base stations. Optical-electrical converters convert the optical signals into electric signals and antennas transmit the electrical signals to subscriber terminals.

1 Claim, 18 Drawing Sheets

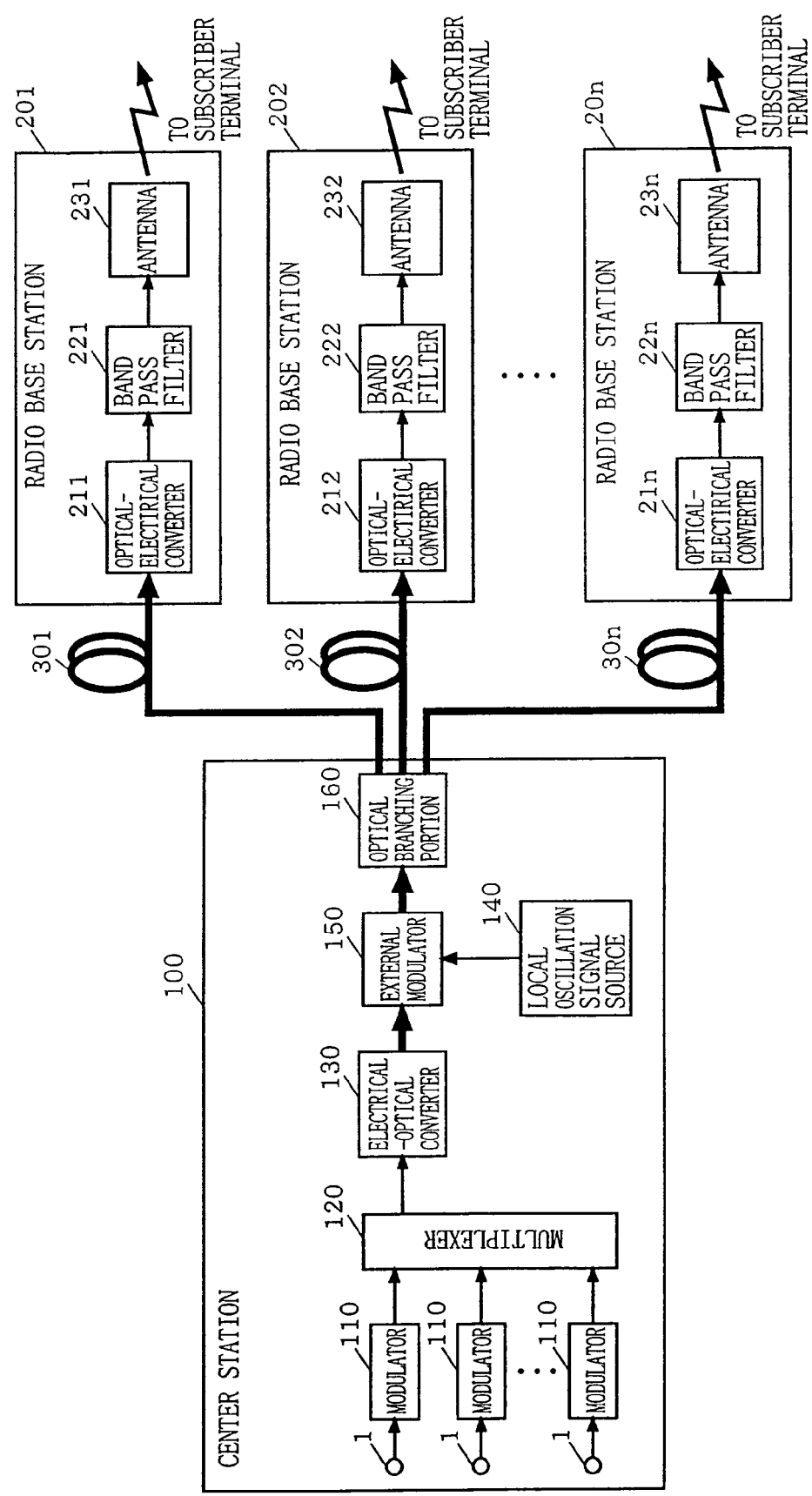
F I G. 1

OPTICAL TRANSMISSION SYSTEM FOR RADIO ACCESS AND HIGH FREQUENCY OPTICAL TRANSMITTER

This application is a divisional application of Ser. No. 09/892,605, filed Jun. 28, 2001 now abandoned.

BACKGROUND OF THE INVENTION

1. Field of the Invention

The present invention relates generally to an optical transmission system for radio access and a high frequency optical transmitter, and more particularly, to an optical transmission system for connecting, in radio access for coupling a center station and a plurality of subscriber terminals with a radio signal (a high frequency radio signal in a microwave band, a millimeter wave band, or the like), the center station and a radio base station by an optical fiber, and a high frequency optical transmitter used for the system.

2. Description of the Background Art

FIG. 17 illustrates an example of the configuration of a conventional optical transmission system used for radio access for connecting a center station and a subscriber terminal through a radio base station for transmitting and receiving a radio signal.

The conventional optical transmission system shown in FIG. 17 is constructed by respectively connecting a center station 600 to a plurality of radio base stations 701 to 70n (n is an integer of not less than two; which is the same in the following present specification) through a plurality of downstream (from the center station to the radio base stations) optical fibers 801 to 80n. The center station 600 includes a plurality of electrical-optical converters 611 to 61n respectively corresponding to the plurality of radio base stations 701 to 70n. The radio base stations 701 to 70n respectively include optical-electrical converters 711 to 71n, modulators 721 to 72n, frequency converters 731 to 73n, local oscillation signal sources 741 to 74n, and antennas 751 to 75n. The operation of the conventional optical transmission system will be described.

In the center station 600, information to be transmitted to the subscriber terminal through the radio base station 70k is inputted in the form of a baseband signal to an input terminal 6k (k=1 to n; which is the same in the following present specification). The electrical-optical converter 61k converts the baseband signal inputted from the input terminal 6k into an optical signal. The optical signal outputted from the electrical-optical converter 61k is transmitted to the radio base station 70k from the center station 600 through the downstream optical fiber 80k.

In the radio base station 70k, the optical signal transmitted from the center station 600 is inputted to the optical-electrical converter 71k. The optical-electrical converter 71k converts the inputted optical signal into an electric signal. The modulator 72k converts the electric signal obtained by the conversion into a signal having an intermediate frequency (an IF signal). The local oscillation signal source 74k outputs a local oscillation signal having a predetermined frequency. The frequency converter 73k receives the IF signal and the local oscillation signal, and converts the IF signal into a signal having a radio frequency (an RF signal) using the local oscillation signal. The RF signal is released to space through the antenna 75k.

FIG. 18 shows, in a case where the center station 600 and the plurality of radio base stations 701 to 707 are connected to each other, the concept of a service area covered by each of the radio base stations. Areas 901 to 907 shown in FIG. 18 represent service areas respectively covered by the radio base stations 701 to 707.

Light signals respectively having different information are respectively transmitted to the radio base stations 701 to 707 from the center station 600 through the downstream optical fibers 801 to 807. In order to avoid interference between the adjacent service areas, the plurality of radio base stations 701 to 707 respectively change the frequencies of local oscillation signals outputted from the local oscillation signal sources 741 to 747 provided therein and convert IF signals into RF signals having different frequencies (fd1 to fd7), to perform radio transmission to the subscriber terminals. With respect to the radio base stations respectively covering the service areas which are not adjacent to each other (which correspond to the radio base stations 701, 705, and 706 in the example of FIG. 18), the same radio frequency (fd1=fd5=fd6) may be set.

However, when the different information are optically transmitted from the center station 600 to the plurality of radio base stations 701 to 70n and then to many subscriber terminals, as shown in FIGS. 17 and 18, various problems arise as follows.

The first problem is that the electrical-optical converters 611 to 61n, whose number (=n) corresponds to the number of the radio base stations 701 to 70n, are required in the center station 600.

The second problem is that the expensive frequency converters 731 to 73n for frequency-converting the IF signals into the RF signals are respectively required in the plurality of radio base stations 701 to 70n.

The third problem is that when information to be transmitted to a lot of subscriber terminals are transmitted upon being time-division multiplexed, a multiplexer is required in the center station 600. In this case, separators are respectively required in the radio base stations 701 to 70n, and high-speed modulation processing is required for each of the modulators 721 to 72n.

The fourth problem is that when the capacity of the one radio base station 70k (the amount of information which can be transmitted from the antenna 75k to the subscriber terminal) is increased for a new subscriber terminal, each of components other than the antenna 75k must be additionally installed in the radio base station 70k, and a multiplexer for multiplexing the RF signals is also required. Particularly when the position of the subscriber terminal to be added is the position where a substantially unobstructed line-of-sight propagation path cannot be ensured from the existing radio base station 70k, the components shown in FIG. 17 must be all newly installed such that the line-of-sight propagation path can be ensured.

The fifth problem is that the frequencies of the local oscillation signals outputted by the local oscillation signal source 74k in the radio base station 70k must be made to differ in order to avoid the interference between the adjacent service areas. Therefore, different components or different adjustments (if with the same components) are required for each radio base station 70k.

FIG. 19 illustrates the configuration of another conventional optical transmission system in which the configuration of each of radio base stations 701 to 70n is simplified.

The conventional optical transmission system shown in FIG. 19 is constructed by respectively connecting a center station 600 and the plurality of radio base stations 701 to 70n through a plurality of downstream optical fibers 801 to 80n. The center station 600 respectively include modulators 621 to 62n, frequency converters 631 to 63n, local oscillation signal sources 641 to 64n, external modulators 651 to 65n, and light sources 661 to 66n so as to correspond to the radio base stations 701 to 70n. The radio base stations 701 to 70n respectively include optical-electrical converters 711 to 71n and antennas 751 to 75n. The operation of the conventional optical transmission system will be described.

In the center station 600, information to be transmitted to the radio base station 70k is inputted in the form of a baseband signal to an input terminal 6k. The modulator 62k modulates the baseband signal inputted from the input terminal 6k to an IF signal. The local oscillation signal source 64k outputs a local oscillation signal having a predetermined frequency. The frequency converter 63k receives the IF signal obtained by the modulation in the modulator 62k and the local oscillation signal outputted from the local oscillation signal source 64k, and frequency-converts the IF signal into an RF signal using the local oscillation signal. The light source 66k generates an optical signal having a predetermined wavelength. The external modulator 65k receives the RF signal obtained by the conversion in the frequency converter 63k and the optical signal outputted from the light source 66k, and intensity-modulates the optical signal using the RF signal. The intensity-modulated optical signal is transmitted to the radio base station 70k through the downstream optical fiber 80k.

The optical signal transmitted from the center station 600 is inputted to the radio base station 70k upon propagating through the downstream optical fiber 80k.

In the radio base station 70k, the optical-electrical converter 71k converts the inputted optical signal into an electric signal, to output an RF signal. The outputted RF signal is released into space from the antenna portion 75k to the subscriber terminal as a radio signal.

In the conventional optical transmission system, therefore, the IF signal is frequency-converted into the RF signal in the center station 600. Accordingly, the radio base stations 701 to 70n respectively require only the optical-electrical converters 711 to 71n in addition to the antenna portions 751 to 75n. Therefore, the conventional light transmission system has the effect of miniaturizing each of the radio base stations 701 to 70n.

In the configuration of the other conventional optical transmission system shown in FIG. 19, however, the frequency converters 631 to 63n, the external modulators 651 to 65n, and the optical-electrical converters 711 to 71n must be high frequency devices (active devices) respectively operating in radio frequency bands. Such high-frequency devices are generally expensive. In such a configuration that the center station 600 manages the plurality of radio base stations 701 to 70n as in the other conventional optical transmission system, therefore, n expensive devices are required, so that the entire system becomes very expensive.

SUMMARY OF THE INVENTION

Therefore, an object of the present invention is to provide an optical transmission system for radio access and a high frequency optical transmitter in which the problems above are solved by so constructing that transmission signals directed toward a plurality of radio base stations are collectively frequency-converted in a center station and optically performing frequency-conversion from an IF signal to an RF signal (further frequency conversion from an RF signal into an IF signal) through an optical transmission path.

The present invention has the following features to attain the above object.

A first aspect of the present invention is directed to an optical transmission system, used for radio access for transmitting information between a center station and a subscriber terminal through a radio base station for transmitting and receiving a radio signal to and from an antenna, for optically transmitting radio signals bidirectionally by respectively connecting a plurality of radio base stations covering different service areas and the center station through a plurality of optical fibers, wherein the center station includes at least an electrical-optical converter, receiving one or more baseband signals as one or more modulated electric signals each having a predetermined intermediate frequency, for converting the electric signals into optical signals by intensity modulation, a local oscillation signal source for outputting a predetermined local oscillation signal, an external modulator for intensity-modulating the optical signal obtained by the conversion in the electrical-optical converter using the local oscillation signal outputted from the local oscillation signal source, and an optical branching portion for branching the optical signal intensity-modulated by the external modulator, and respectively outputting optical signals obtained by the branching to the plurality of optical fibers, and each of the plurality of radio base stations includes at least an optical-electrical converter for converting the optical signal transmitted through the optical fiber into an electric signal in a radio frequency band, and a band pass filter for extracting only an electric signal component in a desired frequency band from the electric signal obtained by the conversion in the optical-electrical converter, and feeding the extracted electric signal component to the antenna.

According to the first aspect, with respect to a downstream system, the electrical-optical converter can be thus shared, and the external modulator for performing optical frequency conversion can be shared because no electrical frequency converter is required. Further, the signals can be multiplexed more easily, thereby making it possible to more easily increase the transmission capacity with the increasing number of subscriber terminals, as compared with the conventional optical transmission system.

The center station may include at least a light source for outputting predetermined light, a local oscillation signal source for outputting a predetermined local oscillation signal, an external modulator for intensity-modulating the light outputted from the light source using the local oscillation signal outputted from the local oscillation signal source, an optical branching portion for branching an optical signal obtained by the intensity modulation in the external modulator into optical signals whose number corresponds to the number of the plurality of radio base stations, and a plurality of IF modulators, receiving one or more modulated electric signals each having a predetermined intermediate frequency by one or more baseband signals for each of the radio base stations to which the electric signal is to be transmitted, for respectively intensity-modulating the optical signals obtained by the branching in the optical branching portion using the electric signals, and respectively outputting the modulated optical signals to the plurality of optical fibers, and each of the plurality of radio base stations may include at least an optical-electrical converter for converting the optical signal transmitted through the optical fiber into an electric signal in a radio frequency band, and feeding the electric signal to the antenna.

In such a configuration, with respect to a downstream system, the external converter for performing optical frequency conversion can be shared because no electrical frequency converter is required. Further, the signals can be multiplexed more easily, thereby making it possible to more easily increase the transmission capacity with the increasing number of subscriber terminals, as compared with the conventional optical transmission system. In addition, no band filter is required. Therefore, radio base stations having the same configuration can be installed even when service areas respectively covered by the radio base stations differ.

The center station may include at least an electrical-optical converter, receiving one or more modulated electric signals each having a predetermined intermediate frequency by one or more baseband signals for converting the electric signals into optical signals by intensity modulation, a local oscillation signal source for outputting a predetermined local oscillation signal, a first external modulator for intensity-modulating the optical signal obtained by the conversion in the electrical-optical converter using the local oscillation signal outputted from the local oscillation signal source, a first optical branching portion for branching the optical signal intensity-modulated by the first external modulator, and respectively outputting optical signals obtained by the branching to a plurality of downstream optical fibers, a plurality of first optical-electrical converters for respectively converting the optical signals transmitted from the plurality of radio base stations through a plurality of upstream optical fibers into electric signals in intermediate frequency bands, and a plurality of demodulators for respectively demodulating the electric signals obtained by the conversion in the plurality of first optical-electrical converters to the baseband signals, and each of the plurality of radio base stations may include at least a second optical branching portion for branching the optical signal transmitted through the downstream optical fiber into two optical signals, a second optical-electrical converter for converting one of the optical signals obtained by the branching in the second optical branching portion into an electric signal in a radio frequency band, a band pass filter for extracting only an electric signal component in a desired frequency band from the electric signal obtained by the conversion in the second optical-electrical converter, a circulator for outputting the electric signal component extracted by the band pass filter and the radio signal received by the antenna, respectively, to the antenna and a second external modulator, and the second external modulator for intensity-modulating the other optical signal obtained by the branching in the second optical branching portion using the radio signal outputted from the circulator, and outputting the intensity-modulated optical signal to the upstream optical fiber.

In such a configuration, with respect to both upstream and downstream systems, the electrical-optical converter can be shared, and the external modulator for performing optical frequency conversion can be shared because no electrical frequency converter is required. Further, the signals can be multiplexed more easily, thereby making it possible to more easily increase the transmission capacity with the increasing number of subscriber terminals, as compared with the conventional optical transmission system.

The center station may include at least a light source for outputting predetermined light, a local oscillation signal source for outputting a predetermined local oscillation signal, a first external modulator for intensity-modulating the light outputted from the light source using the local oscillation signal outputted from the local oscillation signal source, a first optical branching portion for branching an optical signal obtained by the intensity modulation in the first external modulator into optical signals whose number corresponds to the number of the plurality of radio base stations, a plurality of IF modulators, receiving one or more modulated electric signals each having a predetermined intermediate frequency by one or more baseband signals for each of the radio base stations to which the electric signal is to be transmitted, for respectively intensity-modulating the optical signals obtained by the branching in the first optical branching portion using the electric signals, and respectively outputting the modulated optical signals to the plurality of downstream optical fibers, and a plurality of first optical-electrical converters for respectively converting the optical signals transmitted from the plurality of radio base stations through a plurality of upstream optical fibers into electric signals in intermediate frequency bands, and a plurality of demodulators for respectively demodulating the electric signals obtained by the conversion in the plurality of first optical-electrical converters to the baseband signals, and each of the plurality of radio base stations may include a second optical branching portion for branching the optical signal transmitted through the downstream optical fiber into two optical signals, a second optical-electrical converter for converting one of the optical signals obtained by the branching in the second optical branching portion into an electric signal in a radio frequency band, a circulator for outputting the electric signal obtained by the conversion in the second optical-electrical converter and the radio signal received by the antenna, respectively, to the antenna and a second external modulator, and the second external modulator for intensity-modulating the other optical signal obtained by the branching in the second optical branching portion using the radio signal outputted from the circulator, and outputting the intensity-modulated optical signal to the upstream optical fiber.

In such a configuration, with respect to both upstream and downstream systems, the external modulator for performing optical frequency conversion can be shared because no electric frequency converter is required. Further, the signals can be multiplexed more easily, thereby making it possible to more easily increase the transmission capacity with the increasing number of subscriber terminals, as compared with the conventional optical transmission system. In addition, no band filter is required. Therefore, radio base stations having the same configuration can be installed even when the service areas respectively covered by the radio base stations differ.

Preferably, a downstream system through which the optical signal is transmitted by radio from the radio base station to the subscriber terminal and an upstream system through which the optical signal is transmitted by radio from the subscriber terminal to the radio base station are made to differ in a radio frequency to be used. Consequently, the radio signals may not interfere with each other between the upstream system and the downstream system.

Preferably, the frequencies of the radio signals respectively used in the radio base stations are set so as to differ, or the frequencies of the radio signals used in the radio base stations which cover the adjacent service areas are set to differ from each other. Consequently, the radio signals may not interfere with each other between the adjacent service areas.

Preferably, the optical signal outputted from the external modulator is an optical single-sideband signal with a carrier and a single-sideband component. Alternatively, a Mach-Zehnder type external modulator is used for the external modulator, and a bias point in the external modulator is set to a point at which light output power is the minimum or maximum so that the optical signal is intensity-modulated by a component which is twice the frequency of the local oscillation signal. Consequently, it is possible to avoid the decrease in the level of the electric signal after optical-electrical conversion which has conventionally occurred when the optical fiber has dispersion characteristics. Further, in the latter case, the oscillation frequency of the local oscillation signal may be one-half of that in the conventional example, and the operation frequencies of the local oscillation signal source and the external modulator may be one-half of that in the conventional example.

Preferably, a semiconductor laser for converting an electric signal into an optical signal through direct modulation is used for the electrical-optical converter. Consequently, the multiplexed electric signals in intermediate frequency bands can be converted into the optical signals through direct modulation, thereby making it possible to perform the electrical-optical conversion simply and at low cost.

More preferably, an optical fiber in which the wavelength of the optical signal outputted from the electrical-optical converter and the zero dispersion wavelength almost coincide with each other is used for the optical fiber. Consequently, the wavelength of the optical signal and the zero dispersion wavelength of the optical fiber can almost coincide with each other. Accordingly, distortion induced by the dispersion can be avoided, thereby making it possible to realize high-quality transmission.

A second aspect of the present invention is directed to an optical transmission system, used for radio access for transmitting information between a center station and a subscriber terminal through a radio base station for transmitting and receiving a radio signal to and from an antenna, for optically transmitting radio signals bidirectionally by respectively connecting first to n-th radio base stations covering different service areas and the center station through first to n-th upstream and downstream optical fibers respectively provided so as to correspond to the radio base stations, wherein the center station includes first to n-th electrical-optical converters for respectively converting one or more signals each having a predetermined intermediate frequency into first to n-th optical signals having different wavelengths $\lambda d1$ to $\lambda dn$ uniquely corresponding to the first to n-th radio base stations, a wavelength multiplexer for multiplexing the first to n-th optical signals obtained by the conversion, a local oscillation signal source for outputting a local oscillation signal having a predetermined frequency, an optical modulator for intensity-modulating the multiplexed optical signals outputted from the wavelength multiplexer using the local oscillation signal, and a wavelength separator for wavelength-separating the multiplexed optical signals intensity-modulated into first to n-th modulated optical signals having wavelengths $\lambda d1$ to $\lambda dn$, and sending out the k-th modulated optical signal to the k-th downstream optical fiber, and the k-th radio base station includes an optical-electrical converter, receiving the k-th modulated optical signal having the wavelength $\lambda dk$ transmitted through the k-th downstream optical fiber, for converting the modulated optical signal into an electric signal in a radio frequency band, and outputting the electric signal.

According to the second aspect, the optical signals wavelength-multiplexed are collectively externally modulated to frequency-convert the signals in the intermediate frequency bands into the signals in the radio frequency bands. Therefore, the electrical frequency converter, which has been conventionally required, is not required, and the optical modulator for performing the optical frequency conversion can be shared among the plurality of radio base stations. Further, the signals in the radio frequency bands to be transmitted to the plurality of radio base stations are separated from each other in the light wavelength region, thereby making it possible to easily separate the signals even if the radio frequencies radiated from the plurality of radio base stations are the same.

In this case, the center station may include first to n-th electrical-optical converters for respectively converting one or more signals each having a predetermined intermediate frequency into first to n-th downstream optical signals having different wavelengths $\lambda d1$ to $\lambda dn$ uniquely corresponding to the first to n-th radio base stations, first to n-th upstream light sources respectively outputting first to n-th upstream optical signals having wavelengths $\lambda u1$ to $\lambda un$ which differ from any of the wavelengths $\lambda d1$ to $\lambda dn$ and differ from one another, a wavelength multiplexer for multiplexing the first to n-th downstream optical signals obtained by the conversion and the outputted first to n-th upstream optical signals, a local oscillation signal source for outputting a local oscillation signal having a predetermined frequency, an optical modulator for intensity-modulating the multiplexed optical signals outputted from the wavelength multiplexer using the local oscillation signal, a wavelength separator for wavelength-separating the multiplexed optical signals intensity-modulated to the first to n-th modulated downstream optical signals having the wavelengths $\lambda 1$ to $\lambda dn$ and the first to n-th modulated upstream optical signals having the wavelengths $\lambda u1$ to $\lambda un$, and sending out the k-th modulated downstream optical signal, together with the k-th modulated upstream optical signal, to the k-th downstream optical fiber, and first to n-th optical-electrical converters for respectively converting the optical signals transmitted through the first to n-th upstream optical fibers into electric signals, and the k-th radio base station may include a two-wavelength separator, receiving the optical signal transmitted through the k-th downstream optical fiber, for separating the optical signal into the k-th modulated downstream optical signal having the wavelength $\lambda dk$ and the k-th modulated upstream optical signal having the wavelength $\lambda uk$, an optical-electrical converter for converting the k-th modulated downstream optical signal obtained by the separation in the two-wavelength separator into an electric signal and outputting the electric signal, and an RF modulator for intensity-modulating the k-th modulated upstream optical signal obtained by the separation in the two-wavelength separator using the inputted radio signal, and sending out the k-th modulated upstream optical signal intensity-modulated to the k-th upstream optical fiber.

In such a configuration, the first to n-th light sources for outputting light having different wavelengths for transmitting an upstream signal are provided, and the upstream optical signal and a downstream optical signal are wavelength-multiplexed, so that the optical modulator can be shared among the plurality of radio base stations for optical modulation of not only the downstream optical signal but also the upstream optical signal with the local oscillation signal. Further, the upstream optical signal modulated using the local oscillation signal is intensity-modulated using the radio signal received by the antenna, so that mixing of the local oscillation signal and the radio signal is performed in a light region. Accordingly, the radio base station can also have a frequency conversion function for converting the radio signal into the signal having an intermediate frequency.

Preferably, the wavelengths $\lambda d1$ to $\lambda dn$ of the first to n-th downstream optical signals are set so as to belong to a predetermined first wavelength band, the wavelengths $\lambda u1$ to $\lambda un$ of the first to n-th upstream optical signals are set so as to belong to a predetermined second wavelength band, the second wavelength separator in the k-th radio base station wavelength-separates the optical signal transmitted through the k-th downstream optical fiber into a signal in the first wavelength band and a signal in the second wavelength band, to separate the optical signal into the k-th modulated downstream optical signal having the wavelength $\lambda dk$ and the k-th modulated upstream optical signal having the wavelength $\lambda uk$.

The wavelengths of the optical signals outputted from the first to n-th electrical-optical converters and the wavelengths of the optical signals outputted from the first to n-th light sources are set so as to respectively belong to wavelength bands in definite ranges, thereby making it possible to easily separate the modulated downstream optical signal and the modulated upstream optical signal in the two-wavelength separator in the radio base station.

On the other hand, the center station may include first to n-th electrical-optical converters for respectively converting one or more signals each having a predetermined intermediate frequency into first to n-th downstream optical signals having different wavelengths $\lambda d1$ to $\lambda dn$, which belong to a predetermined first wavelength band, uniquely corresponding to the first to n-th radio base stations, first to n-th upstream light sources respectively outputting first to n-th upstream optical signals having wavelengths $\lambda u1$ to $\lambda un$ which differ from any of the wavelengths $\lambda d1$ to $\lambda dn$ and belong to a predetermined second wavelength band, a wavelength multiplexer for multiplexing the first to n-th downstream optical signals obtained by the conversion and the outputted first to n-th upstream optical signals, a local oscillation signal source for outputting a local oscillation signal having a predetermined frequency, an optical modulator for intensity-modulating the multiplexed optical signals outputted from the wavelength multiplexer using the local oscillation signal, a wavelength separator for wavelength-separating the multiplexed optical signals intensity-modulated into first to n-th modulated downstream optical signals having the wavelengths $\lambda d1$ to $\lambda dn$ and the first to n-th modulated upstream optical signals having the wavelengths $\lambda u1$ to $\lambda un$, and sending out the k-th modulated downstream optical signal, together with the k-th modulated upstream optical signal, to the k-th downstream optical fiber, and first to n-th optical-electrical converters for respectively converting the optical signals transmitted through the first to n-th upstream optical fibers into electric signals, and the k-th radio base station may include an electro-absorption type modulator, receiving the optical signal transmitted through the k-th downstream optical fiber to separate the optical signal into the k-th modulated downstream optical signal having the wavelength $\lambda dk$ and the k-th modulated upstream optical signal having the wavelength $\lambda uk$, converting the k-th modulated downstream optical signal in the first wavelength band representing an optical-electrical conversion function into an electric signal and outputting the electric signal, and intensity-modulating the k-th modulated upstream optical signal in the second wavelength band representing an electrical-optical conversion function using the inputted radio signal and sending out the k-th modulated upstream optical signal intensity-modulated to the k-th upstream optical fiber.

In such a configuration, the wavelengths of the optical signals outputted from the first to n-th electrical-optical converters and the wavelengths of the optical signals outputted from the first to n-th light sources are suitably set, and the electro-absorption type modulator for performing optical-electrical conversion and electrical-optical conversion is installed in the radio base station depending on the wavelength of the inputted optical signal in place of the two-wavelength separator, the optical-electrical converter, and the RF modulator, described above. Consequently, it is possible to significantly simplify the configuration of the radio base station in addition to the effect obtained by the above-mentioned configuration.

Preferably, the first to n-th upstream light sources respectively output the first to n-th upstream optical signals which uniquely correspond to the first to n-th downstream optical signals and have wavelengths $\lambda u1$ to $\lambda un$ respectively different from the wavelengths $\lambda d1$ to $\lambda dn$ of the first to n-th downstream optical signals by predetermined amounts fs. Consequently, it is possible to simply separate the wavelengths $\lambda dk$ and $\lambda uk$ by using only an n output wavelength separator for separating n optical signals multiplexed at equal spacing in the configuration of the wavelength separator.

A third aspect of the present invention is directed to a high frequency optical transmitter, used in a center station connected to a plurality of radio base stations respectively covering different service areas using a plurality of optical fibers, for optically transmitting radio signals, characterized by comprising a three-branching portion for branching an inputted electric signal into first and second electric signals which are the same in phase and a third electric signal which has a phase difference of 90° to the first and second electric signals;

an electrical-optical converter for converting the third electric signal into a light intensity modulated signal;

a first delay controller for adjusting the propagation time of the first electric signal;

a second delay controller for adjusting the propagation time of the second electric signal;

a two-branching portion for branching an inputted local oscillation signal into first and second local oscillation signals which are opposite in phase;

a third delay controller for adjusting the propagation time of the first local oscillation signal;

a fourth delay controller for adjusting the propagation time of the second local oscillation signal;

a first multiplexer for multiplexing the first electric signal outputted from the first delay controller and the first local oscillation signal outputted from the third delay controller;

a second multiplexer for multiplexing the second electric signal outputted from the second delay controller and the second local oscillation signal outputted from the fourth delay controller; and a differential intensity modulator, having first and second electrodes, for modulating the light-intensity modulated signal outputted from the electrical-optical converter by respectively inputting signals obtained by the multiplexing in the first and second multiplexers to the first and second electrodes, the first to fourth delay controllers being adjusted such that the first and second electric signals inputted to the first and second electrodes of the differential intensity modulator through the first and second multiplexers are the same in phase, to subject the optical signal outputted from the electrical-optical converter to phase modulation and subject the optical signal to optical modulation which is the same in amount as and is opposite in phase to the frequency deviation (an FM index) of alight frequency modulation component of the optical signal.

As described above, according to the third aspect, the optical signal outputted from the electrical-optical converter is phase-modulated using a part of the electric signal inputted to the electrical-optical converter utilizing the external modulator for performing frequency conversion. Consequently, the light frequency modulation component (wavelength chirping) which occurs at the time of the electrical-optical conversion can be canceled without using an additional optical component, and distortion due to wavelength dispersion which is induced by the function of the light frequency modulation and the wavelength dispersion characteristics of the optical fiber can be suppressed, thereby making it possible to realize high-performance optical transmission.

A high frequency optical transmitter may include a three-branching portion for branching an inputted electric signal into first and second electric signals which are the same in phase and a third electric signal which has a phase difference of 90° from the first and second electric signals;

an electrical-optical converter for converting the third electric signal into a light intensity modulated signal;

a first delay controller for adjusting the propagation time of the first electric signal;

a second delay controller for adjusting the propagation time of the second electric signal;

a two-branching portion for branching an inputted local oscillation signal into first and second local oscillation signals which have a difference of 90° to each other;

a third delay controller for adjusting the propagation time of the first local oscillation signal;

a fourth delay controller for adjusting the propagation time of the second local oscillation signal;

a first multiplexer for multiplexing the first electric signal outputted from the first delay controller and the first local oscillation signal outputted from the third delay controller;

a second multiplexer for multiplexing the second electric signal outputted from the second delay controller and the second local oscillation signal outputted from the fourth delay controller; and a differential intensity modulator, having first and second electrodes, for modulating the light-intensity modulated signal outputted from the electrical-optical converter by respectively inputting signals obtained by the multiplexing in the first and second multiplexers to the first and second electrodes, the first and second delay controllers being adjusted such that a phase difference between the first and second electric signals inputted to the first and second electrodes of the differential intensity modulator through the first and second multiplexers is zero, to subject the optical signal outputted from the electrical-optical converter to phase modulation and subject the optical signal to optical modulation which is the same in amount as and is opposite in phase to the frequency deviation of a light frequency modulation component of the optical signal, and the third and fourth delay controllers being adjusted such that the first and second local oscillation signals inputted to the first and second electrodes of the differential intensity modulator through the first and second multiplexers have a difference of 90° to each other, to subject the optical signal to optical side-band modulation with a light carrier.

In such a configuration, the optical single-sideband modulation is performed, thereby making it possible to avoid the problem that an RF signal component obtained by frequency-converting the electric signal is greatly decreased because an upper sideband and a lower sideband of the light-intensity modulation component are canceled by the effect of wavelength dispersion which occurs in a case where the optical signal which has been subjected to non-differential external modulation (optical double-sideband modulation) is subjected to optical-electrical conversion after being transmitted a long distance.

Furthermore, a high frequency optical transmitter may include a two-branching portion for branching an inputted electric signal into first and second electric signals which have a difference of 90° to each other;

an electrical-optical converter for converting the first electric signal into a light intensity modulated signal;

a delay controller for adjusting the propagation time of the second electric signal; and an integrated modulator, comprising a phase modulator and an intensity modulator formed on the same substrate, for modulating the light intensity modulated signal outputted from the electrical-optical converter by inputting the second electric signal outputted from the delay controller to the phase modulator and inputting an inputted local oscillation signal to the intensity modulator, in the phase modulator, the optical signal outputted from the electrical-optical converter being subjected to phase modulation and subjected to optical modulation which is opposite in phase to the frequency deviation of a light frequency modulation component of the optical signal.

In such a configuration, it is possible to easily make a delay adjustment for canceling the light frequency modulation component by integrating the phase modulator for canceling the light frequency modulation component and the intensity modulator for performing frequency conversion. Further, the electric signal inputted to the phase modulator and the local oscillation signal inputted to the intensity modulator need not be multiplexed, thereby making it possible to further reduce the power of the electric signal inputted to the intensity modulator.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the configuration of an optical transmission system according to a first embodiment of the present invention;

DESCRIPTION OF THE PREFERRED EMBODIMENTS

First Embodiment

Figure 2:
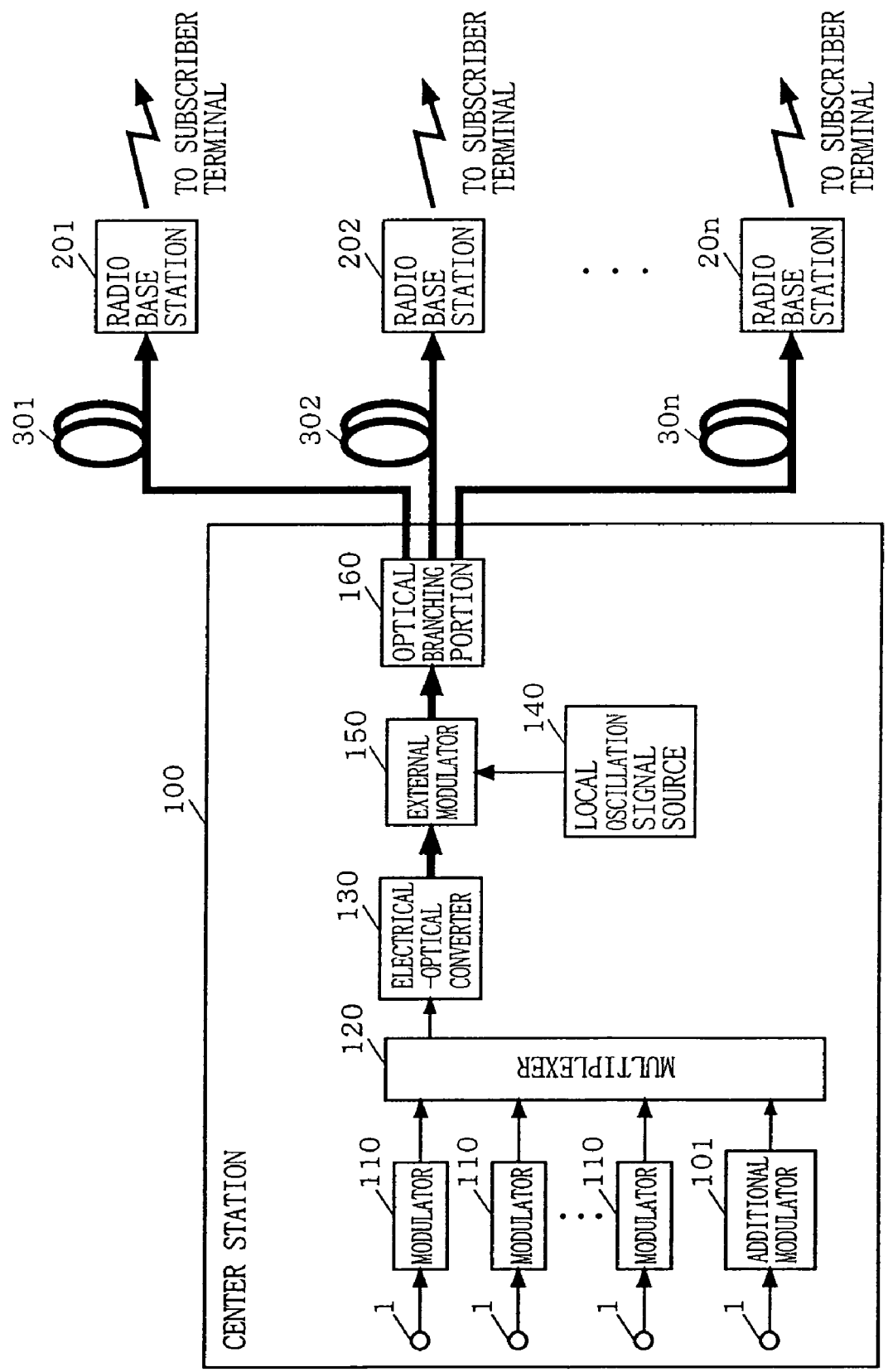
FIG. 2 is a block diagram showing a configuration in a case where a subscriber terminal is added in the optical transmission system according to the first embodiment of the present invention.

FIG. 1 is a block diagram showing the configuration of an optical transmission system for radio access according to a first embodiment of the present invention. In FIG. 1, the optical transmission system according to the first embodiment is so constructed that a center station 100 and a plurality of radio base stations 201 to 20$n$ are respectively connected to each other through a plurality of downstream optical fibers 301 to 30$n$.

The center station 100 includes a plurality of modulators 110, a multiplexer 120, an electrical-optical converter 130, a local oscillation signal source 140, an external modulator 150, and an optical branching portion 160. The radio base stations 201 to 20$n$ respectively include optical-electrical converters 211 to 21$n$, band filters 221 to 22$n$, and antennas 231 to 23$n$. The operation of the optical transmission system according to the first embodiment will be described.

In the center station 100, different information to be transmitted to subscriber terminals are respectively inputted to input terminals 1 in the form of baseband signals. The plurality of modulators 110 respectively modulate the baseband signals inputted from the input terminals 1 to IF signals having different predetermined frequencies. The frequencies are respectively determined on the basis of the frequencies of radio signals to be transmitted to the subscriber terminals from the radio base stations 201 to 20$n$. The multiplexer 120 multiplexes the plurality of IF signals outputted from the plurality of modulators 110. The electrical-optical converter 130 converts the IF signals multiplexed by the multiplexer 120 to an optical signal through intensity modulation. The local oscillation signal source 140 outputs a local oscillation signal having a predetermined frequency. The frequency of the local oscillation signal is determined on the basis of the modulation frequencies of the modulators 110 and the frequencies of the radio signals. The external modulator 150 receives the optical signal obtained by the conversion in the electrical-optical converter 130 and the local oscillation signal outputted from the local oscillation signal source 140, and intensity-modulates the optical signal using the local oscillation signal. The optical branching portion 160 branches the optical signal intensity-modulated by the external modulator 150 into optical signals, whose number corresponds to the number (=n) of the radio base stations, and outputs the optical signals, respectively, to the radio base stations 201 to 20$n$ through the downstream optical fibers 301 to 30$n$.

The optical signals outputted from the center station 100 are respectively inputted to the radio base stations 201 to 20$n$ after propagating through the downstream optical fibers 301 to 30$n$. In the radio base station 20$k$, the optical-electrical converter 21$k$ converts the inputted optical signal into an electric signal. By the conversion, an RF signal obtained by frequency-converting the IF signal can be obtained. The reason for this is that in the electrical-optical converter 130 and the external modulator 150 in the center station 100, intensity modulation is doubly performed using the IF signal and the local oscillation signal. The band filter 22$k$ receives the RF signal outputted from the optical-electrical converter 21$k$, and extracts only an RF signal component having a desired radio frequency therefrom. The extracted RF signal component is released to space from the antenna 23$k$ to the subscriber terminal.

In the present invention, the intensity modulation is thus doubly performed in the center station 100. In each of the radio base stations 201 to 20$n$, therefore, the RF signal obtained by frequency-converting the IF signal can be obtained by only converting the optical signal which has propagated into the electric signal. Consequently, the electrical-optical converter 130 and the external modulator 150 for performing frequency conversion can be shared among the plurality of radio base stations 201 to 20$n$. Consequently, the number of components in each of the radio base stations 201 to 20$n$ can be more significantly reduced, as compared with that in the conventional example. Further, it is easy to carry and install, for example, each of the radio base stations 201 to 20$n$.

Furthermore, the center station 100 frequency-division multiplexes the information to be transmitted to the plurality of subscriber terminals in the multiplexer 120 for analog optical transmission. In the center station 100, therefore, the modulators 110, whose number corresponds to the number of information to be multiplexed, are prepared. In the optical transmission system according to the present invention, therefore, no separator/multiplexer and high-speed modulator are required, unlike the case where information to be transmitted is time-division multiplexed for transmission as described in the Background Art section.

Furthermore, in the present invention, the intensity modulation is doubly performed. Accordingly, it is possible to use a semiconductor laser, which is applicable only to a relatively low frequency signal but is superior in distortion characteristics to the external modulator, for intensity modulation of the frequency-division multiplexed IF signals (performed by the electrical-optical converter 130). Also, it is possible to use an external modulator which operates to a high frequency for intensity modulation of the local oscillation signal (performed by the external modulator 150). Further, the frequency of the local oscillation signal is relatively high. Accordingly, an external modulator which has been matched in a particular high frequency band for modulation can also be used for the intensity modulation of the local oscillation signal. Further, a Mach-Zehnder type external modulator can also be used for the intensity modulation of the local oscillation signal. When the Mach-Zehnder type external modulator is used, a bias point is set to a point at which light output power is the maximum or the minimum, thereby making it possible to perform optical frequency conversion at a frequency which is twice the frequency of the local oscillation signal. A method of setting the bias point cannot be used for the intensity modulation of the IF signals frequency-division multiplexed because a second-order distortion component is increased. However, the method can be used for the intensity modulation of the local oscillation signal because the local oscillation signal is of only one carrier. Further, in this method, the frequency of the local oscillation signal used for the intensity modulation may be a frequency which is one-half of that in the normal frequency conversion. Accordingly, it is possible to use a low-cost local oscillation signal source 140.

On the other hand, a single mode fiber (SMF) having a zero dispersion wavelength at 1.3 µm is generally used for an optical fiber used in optical transmission, for example. Generally when the optical fiber is laid, not only an actually required number of optical fibers, but also preliminary optical fibers which are currently not used, are simultaneously laid in consideration of future use. Consequently, an unused SMF which has already been laid may be thus used as the downstream optical fiber 30k in the present invention. Further, when an optical amplifier must be used in order to compensate for a branching loss and a transmission loss, a wavelength of 1.5 µm is used as the wavelength of a light source used for the electrical-optical converter 130. At this time, when double-sideband modulation (DSB modulation) is used as a modulation scheme carried out in the external modulator 150, and a high frequency signal in a microwave band or a millimeter wave band is optically transmitted by the SMF, the power of the high frequency signal after the optical transmission may be greatly decreased depending on the transmission distance due to the effect of the dispersion of the SMF. In order to avoid the effect of the dispersion, an optical single-sided band modulation (optical SSB modulation) with a carrier and a single-sideband component may be used for the modulation scheme carried out in the external modulator 150. Further, external modulation may be performed using a Mach-Zehnder type external modulator as the external modulator 150 and by setting a point at which light output power is the minimum or the maximum to a bias point.

In a case where the downstream optical fiber 30(n+1) is newly laid, for example, when the zero dispersion wavelength of the downstream optical fiber 30(n+1) and the wavelength of light outputted from the electrical-optical converter 130 can be selected, it is desired that both the wavelengths be selected to coincide with each other. In this case, even if the DSB modulation is used as a modulation scheme, it is not affected by the dispersion of the SMF. Further, in the electrical-optical converter 130, when the frequency-division multiplexed IF signals are converted into the optical signal through direct modulation, distortion due to dispersion corresponding to the frequency after the frequency conversion is induced irrespective of the external modulation scheme of the local oscillation signal. From the point of view of preventing the distortion due to dispersion from being induced, it is desired that the zero dispersion wavelength of the downstream optical fiber 30(n+1) and the wavelength of the light outputted from the electrical-optical converter 130 coincide with each other.

Description is made of a case where a subscriber terminal is added to increase the transmission capacity in the optical transmission system. FIG. 2 is a block diagram showing a configuration in a case where the subscriber terminal is added in the optical transmission system according to the first embodiment of the present invention.

As described above, the center station 100 frequency-division multiplexes information to be transmitted to a plurality of subscriber terminals. As can be seen from comparison between FIG. 1 and FIG. 2, when the subscriber terminal is added, therefore, only a corresponding additional modulator 101 is required to be added to the center station 100, to input its output signal to the multiplexer 120. Consequently, an IF signal outputted from the additional modulator 101 is frequency-division multiplexed and is optically transmitted to all the radio base stations 201 to 20n. Accordingly, the corresponding radio base station converts the optically transmitted optical signal into an RF signal, and then extracts the RF signal having a desired radio frequency through the band filter 22k. Therefore, the present invention shows that it is more simply feasible to increase the transmission capacity as the new subscriber terminal is added, as compared with that in the Background Art section.

When the position of the subscriber terminal to be added is a position where a line-of-sight propagation path cannot be ensured from the existing radio base station, if there is room for the number of branches by the optical branching portion 160, the downstream optical fiber 30(n+1) and a new radio base station 20(n+1) may be additionally installed, thereby making it possible to more significantly reduce the number of components which must be additionally installed, as compared with that in the above-mentioned Background Art.

As described above, in the optical transmission system according to the first embodiment of the present invention, the IF signal obtained by frequency-division multiplexing the plurality of IF signals is converted into an optical signal by intensity modulation, and the optical signal is externally modulated using the local oscillation signal, thereby collectively frequency-converting the plurality of IF signals into the RF signals in an optical signal state. Information to be transmitted to the subscriber terminals are optically transmitted in the form of the RF signals from the center station 100 to the plurality of radio base stations 201 to 20n. Consequently, the following effect is obtained in the present invention.

First, the plurality of IF signals are optically transmitted upon being frequency-division multiplexed in the center station 100. Accordingly, the electrical-optical converter 130 can be shared among the plurality of radio base stations 201 to 20n. Second, the frequency conversion is optically performed by the external modulator 150 in the center station 100. Accordingly, the electrical frequency converter which is an indispensable component in the Background Art is not required in each of the radio base stations 210 to 20n, and the external modulator 150 can be shared among the radio base stations 201 to 20n. Third, unlike the conventional configuration, the modulator having a multiplexer/separator and a high-speed modulation function is not required in the present invention. Fourth, the capacity can be easily increased as new subscriber terminals are added, thereby making it possible to provide an optical transmission system superior in expandability.

Second Embodiment

In the optical transmission system according to the first embodiment, the plurality of IF signals are multiplexed by the frequency division multiplexing, and the IF signals frequency-division multiplexed are doubly intensity-modulated. In the radio base stations 201 to 20n, therefore, the band filters 221 to 22n must be respectively used to extract RF signal components having desired radio frequencies from the transmitted RF signals.

In the second embodiment, description is made of an optical transmission system which does not respectively require the band filters 221 to 22n in the configurations of radio base stations 201 to 20n.

Figure 3:
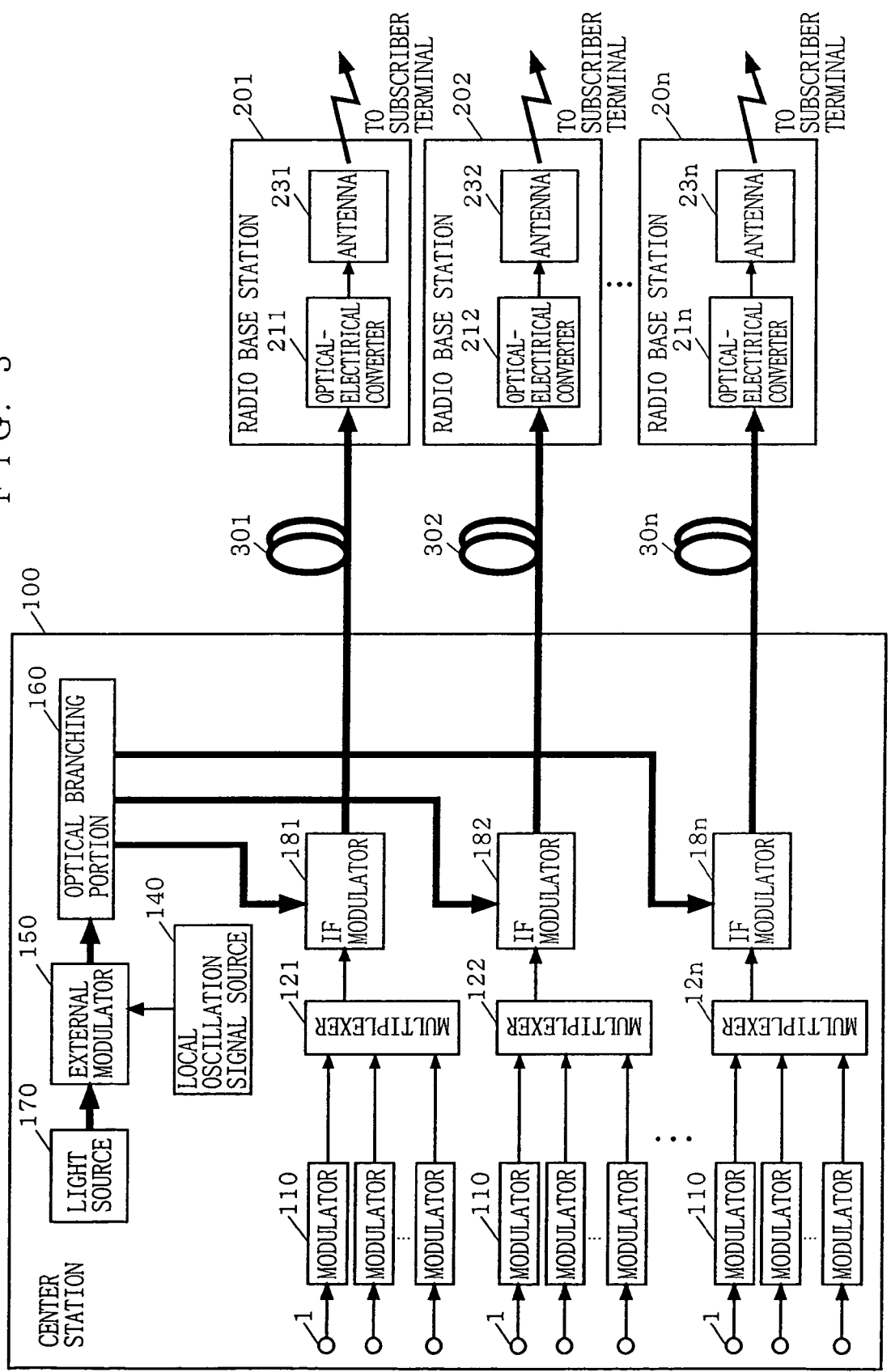
FIG. 3 is a block diagram showing the configuration of an optical transmission system according to a second embodiment of the present invention.

FIG. 3 is a block diagram showing the configuration of an optical transmission system for radio access according to a second embodiment of the present invention. In FIG. 3, the optical transmission system according to the second embodiment is so constructed that a center station 100 and a plurality of radio base stations 201 to 20n are respectively connected to each other through a plurality of downstream optical fibers 301 to 30n.

The center station 100 includes a plurality of modulators 110, a plurality of multiplexers 121 to 12n, a plurality of IF modulators 181 to 18n, a light source 170, a local oscillation signal source 140, an external modulator 150, and an optical branching portion 160. The radio base stations 201 to 20n respectively include optical-electrical converters 211 to 21n and antennas 231 to 23n. The operation of the optical transmission system according to the second embodiment will be described below.

In the center station 100, different information to be transmitted to subscriber terminals are respectively inputted to input terminals 1 in the form of baseband signals. The plurality of modulators 110 respectively modulate the baseband signals inputted from the input terminals 1 to IF signals having different predetermined frequencies. The frequencies are respectively determined on the basis of the frequencies of radio signals transmitted to the subscriber terminals from the radio base stations 201 to 20n. Each of the multiplexers 121 to 12n multiplexes the plurality of IF signals outputted from the plurality of modulators 110 for each of the radio base stations 201 to 20n. The light source 170 generates an optical signal having a predetermined wavelength. The local oscillation signal source 140 outputs a local oscillation signal having a predetermined frequency. The frequency of the local oscillation signal is determined on the basis of the modulation frequencies of the modulators 110 and the frequencies of the radio signals. The external modulator 150 receives the optical signal outputted from the light source 170 and the local oscillation signal outputted from the local oscillation signal source 140, and intensity-modulates the optical signal using the local oscillation signal. The optical branching portion 160 branches the optical signal intensity-modulated by the external modulator 150 into optical signals, whose number corresponds to the number (=n) of the radio base stations, and respectively outputs the optical signals to the plurality of IF modulators 181 to 18n. Each of the IF modulators 181 to 18n receives the optical signal obtained by the branching and an IF signal obtained by the multiplexing, and intensity-modulates the optical signal depending on the IF signal. The IF modulators 181 to 18n respectively correspond to the radio base stations 201 to 20n. Each of the IF modulators 181 to 18n intensity-modulates the optical signal depending on the IF signal such that only an RF signal component used in a service area covered by the corresponding radio base station is transmitted. The optical signals intensity-modulated by the IF modulators 181 to 18n are respectively transmitted to the radio base stations 201 to 20n through the downstream optical fibers 301 to 30n.

The optical signals outputted from the center station 100 are respectively inputted to the radio base stations 201 to 20n after propagating through the downstream optical fibers 301 to 30n. In the radio base station 20k, the optical-electrical converter 21k converts the inputted optical signal into an electric signal. By the conversion, an RF signal obtained by frequency-converting the IF signal and having a desired radio frequency can be obtained. The reason for this is that in the external modulator 150 and the IF modulator 18k in the center station 100, intensity modulation is doubly performed using the local oscillation signal and the IF signal. The RF signal obtained by the conversion is released to space from the antenna 23k to the subscriber terminal.

As described above, in the optical transmission system according to the second embodiment of the present invention, the IF modulators 181 to 18n are installed in the center station 100 for the radio base stations 201 to 20n, and only the RF signal component used in the service area covered by each of the radio base stations 201 to 20n is transmitted to the radio base station. In the radio base station 20k, therefore, radio transmission can be performed at different frequencies for the adjacent service areas without using the band filter 22k for extracting the RF signal component having a desired radio frequency, as described in the first embodiment. In the configuration, optical transmission is possible even at the same frequency. Further, the band filter 22k is not used for the radio base station 20k. Accordingly, the radio base station from which the desired radio frequency can be outputted need not be selected and used for each of the service areas. Alternatively, the radio base station need not be adjusted such that the desired radio frequency can be outputted for each of the service areas (that is, in the service areas, the radio base stations having the same configuration can be used). Consequently, it is feasible to reduce the cost of the optical transmission system.

Third Embodiment

The first and second embodiments were characterized by a case where information is transmitted from the center station to the subscriber terminal (in a downstream direction). Accordingly, description was made of the optical transmission system comprising the configuration for only downstream transmission.

In the third embodiment, description is then made of an optical transmission system in which an RF signal in an optical signal state obtained by frequency-converting an IF signal is utilized for a case where information is transmitted from a subscriber terminal to a center station 100 (in an upstream direction), to simplify a configuration required for upstream transmission.

Figure 4:
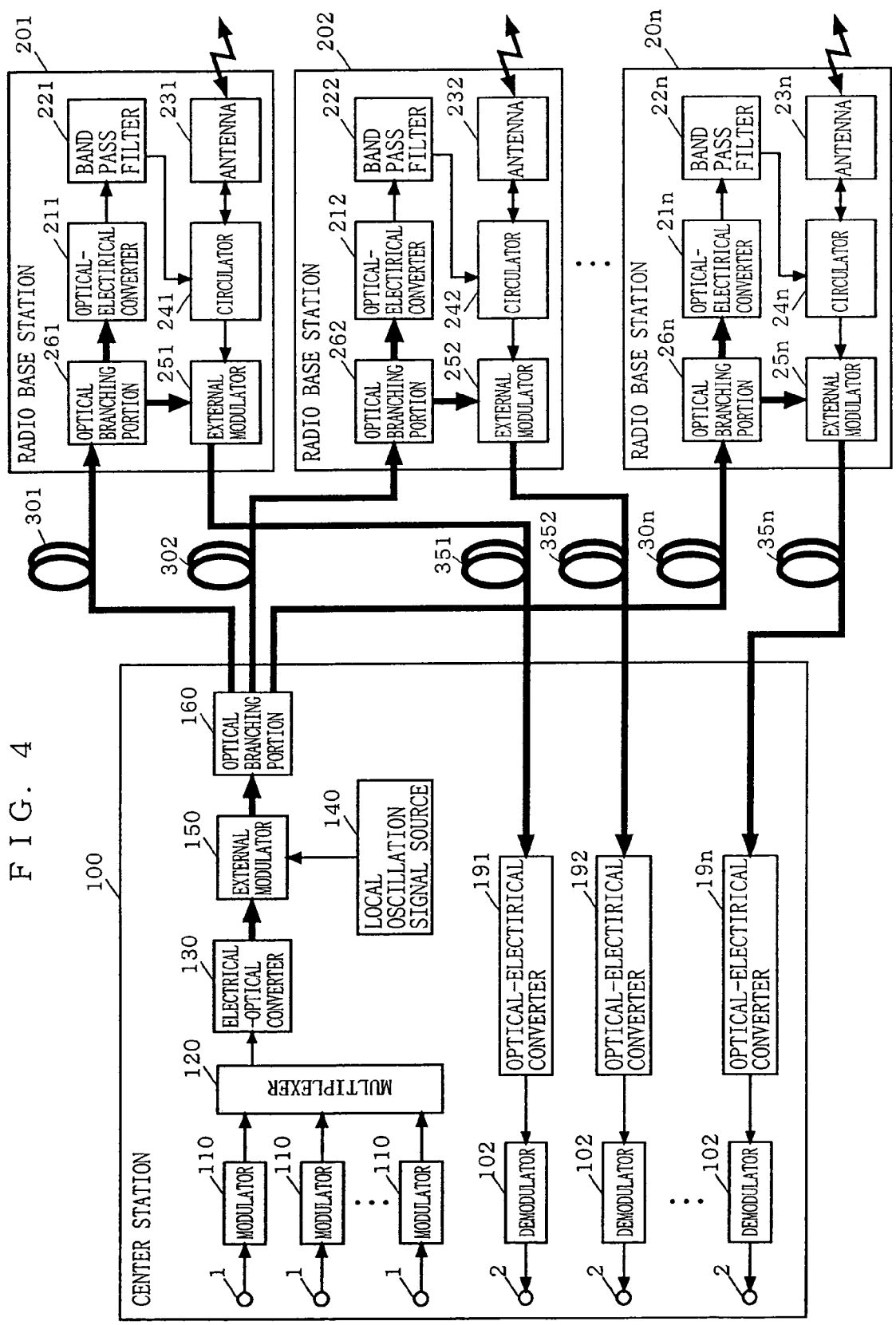
FIG. 4 is a block diagram showing the configuration of an optical transmission system according to a third embodiment of the present invention.

FIG. 4 is a block diagram showing the configuration of an optical transmission system for radio access according to a third embodiment of the present invention. In FIG. 4, the optical transmission system according to the third embodiment is so constructed that a center station 100 and a plurality of radio base stations 201 to 20n are respectively connected to each other through a plurality of downstream optical fibers 301 to 30n and a plurality of upstream optical fibers 351 to 35n.

The center station 100 includes a plurality of modulators 110, a plurality of demodulators 102, a multiplexer 120, an electrical-optical converter 130, a local oscillation signal source 140, an external modulator 150, an optical branching portion 160, and a plurality of optical-electrical converters 191 to 19n. The radio base stations 201 to 20n respectively include optical branching portions 261 to 26n, optical-electrical converters 211 to 21n, external modulators 251 to 25n, band filters 221 to 22n, circulators 241 to 24n, and antennas 231 to 23n. The operation of the optical transmission system according to the third embodiment will be described below.

Description is now made of the downstream transmission from the center station 100 to each of the radio base stations 201 to 20n.

Processing from the time when a plurality of baseband signals are respectively inputted to input terminals 1 in the center station 100 to the time when optical signals are respectively outputted to the radio base stations 201 to 20n after propagating through downstream optical fibers 301 to 30n in the downstream transmission is the same as the processing described in the first embodiment and hence, the description thereof is not repeated.

In the radio base station 20k, the optical branching portion 26k branches the inputted optical signal into two optical signals, and outputs one of the optical signals obtained by the branching and the other optical signal, respectively, to the optical-electrical converter 21k and the external modulator 25k. The optical-electrical converter 21k converts the optical signal obtained by the branching and outputted from the optical branching portion 26k into an electric signal. By the conversion, an RF signal obtained by frequency-converting an IF signal can be obtained. The band filter 22k receives the RF signal outputted from the optical-electrical converter 21k, and extracts only an RF signal component having a desired radio frequency. The extracted RF signal component is released to space from the antenna 23k to the subscriber terminal through the circulator 24k.

Description is now made of upstream transmission from each of the radio base stations 201 to 20n to the center station 100.

An RF signal transmitted from the subscriber terminal is received by the antenna 23k. The received RF signal is outputted to the external modulator 25k through the circulator 24k. In the present invention, the circulator 24k is thus provided between the optical-electrical converter 21k and the antenna 23k, so that the antenna 23k is shared between the upstream transmission and the downstream transmission.

The external modulator 25k receives the optical signal obtained by the branching and outputted from the optical branching portion 26k and the RF signal received by the antenna 23k, and intensity-modulates the optical signal by the RF signal. The optical signal intensity-modulated by the external modulator 25k is outputted to the center station 100 through the upstream optical fiber 35k.

The optical signals respectively outputted from the radio base stations 201 to 20n are inputted to the center station 100 after respectively propagating through the upstream optical fibers 351 to 35n. In the center station 100, each of the optical-electrical converters 191 to 19n converts the inputted optical signal into an electric signal. By the conversion, an IF signal obtained by frequency-converting an RF signal can be obtained. The demodulators 102 respectively demodulate the IF signals obtained by the conversion in the optical-electrical converters 191 to 19n to baseband signals, and output the baseband signals from output terminals 2.

In the radio base station 20k, the optical signal obtained by the branching and outputted to the external modulator 25k is intensity-modulated using the local oscillation signal generated by the local oscillation signal source 140 in the external modulator 150 provided in the center station 100. In the external modulator 25k, therefore, the optical signal obtained by the branching and outputted is intensity-modulated using the RF signal received by the antenna 23k, so that the intensity modulation is doubly performed using the local oscillation signal and the RF signal. Accordingly, the optical signal propagating from the external modulator 25k in the radio base station 20k is converted into an electric signal by the optical-electrical converter 19k in the center station 100, thereby making it possible to obtain the IF signal obtained by frequency-converting the RF signal. In order to avoid the interference between an upstream signal transmitted from the subscriber terminal and a downstream signal transmitted from the center station 100, the frequencies of the RF signals used in the respective directions must be made to differ.

As described above, in the present invention, the downstream optical signal which has already been intensity-modulated using the local oscillation signal is branched into two optical signals using the optical branching portion 26k installed in the radio base station 20k, and one of the optical signals is utilized as the upstream optical signal inputted to the external modulator 25k. In the external modulator 25k, therefore, the RF signal transmitted from the subscriber terminal is optically frequency-converted into the IF signal, thereby making it possible to install the local oscillation signal source 140 and the modulator 110 in the center station 100. As a result, in the present invention, each of the radio base stations 201 to 20n can be miniaturized.

Furthermore, processing performed in the optical transmission system according to the third embodiment will be specifically described with reference to FIG. 5.

Figure 5:
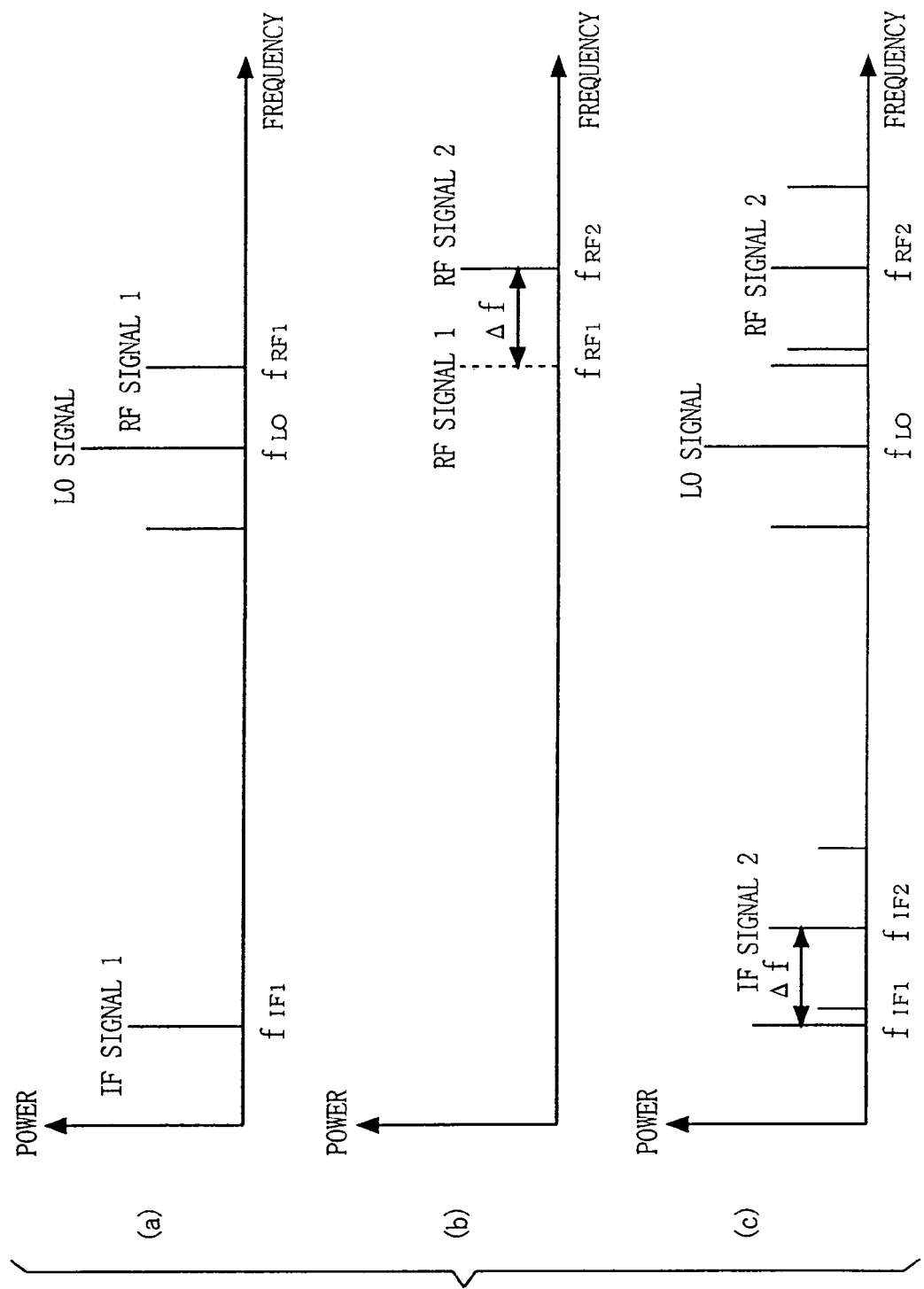
FIG. 5 shows diagrams each showing an example of a signal spectrum processed by the optical transmission system according to the third embodiment of the present invention.

(a) of FIG. 5 is a diagram showing an example of the spectrum of the downstream signal outputted from the optical-electrical converter 21k. In this example, it is indicated that an IF signal 1 (frequency: $f_{IF1}$) is converted into a downstream RF signal 1 (frequency: $f_{RF1}$) by an LO signal (frequency: $f_{LO}$). (b) of FIG. 5 is a diagram showing an example of the spectrum of the upstream signal received by the antenna 23k. In this example, it is indicated that an upstream RF signal 2 (frequency: $f_{RF2}$) having a frequency difference of $\Delta f$ from the downstream RF signal 1 is received by the antenna 23k. In the external modulator 25k, the optical signal transmitted from the center station 100 is intensity-modulated using the RF signal 2, so that mixing of the signals having the spectrums shown in FIGS. 5(a) and 5($b$) is performed in the state of light. A signal spectrum in a case where an optical signal obtained by the mixing is converted into an electric signal in the optical-electrical converter 19$k$ is as illustrated in (c) of FIG. 5. That is, an IF signal 2 having a frequency $f_{IF2}$ is obtained by mixing the LO signal and the RF signal 2 in the external modulator 25$k$. Consequently, only a component having the frequency $f_{IF2}$ is separated by the band filter, thereby making it possible to extract only the IF signal 2 obtained by down-converting the RF signal 2. At this time, the frequency difference between the IF signal 1 and the IF signal 2 is $\Delta f$.

The frequency of the upstream RF signal 2 is separated from the frequency of the downstream RF signal 1 by $\Delta f$, so that the upstream signal and the downstream signal can be down-converted into signals having low frequencies without being adversely affected by each other.

As described above, the optical transmission system according to the third embodiment of the present invention also has the effect of miniaturizing each of the radio base stations 201 to 20$n$ with respect to the upstream system in addition to the effect obtained with respect to the downstream system described in the first embodiment, so that it is easily installed outdoors.

In the first to third embodiments, the plurality of modulators 110 are provided in order to respectively modulate the inputted baseband signals into the plurality of IF signals having different frequencies. When the baseband signal may be only modulated to the IF signal having a single frequency, however, the one modulator 110 may be provided. In this case, the IF signal outputted from the modulator 110 may be directly inputted to the electrical-optical converter 130 without providing the multiplexer 120.

Fourth Embodiment

Figure 6:
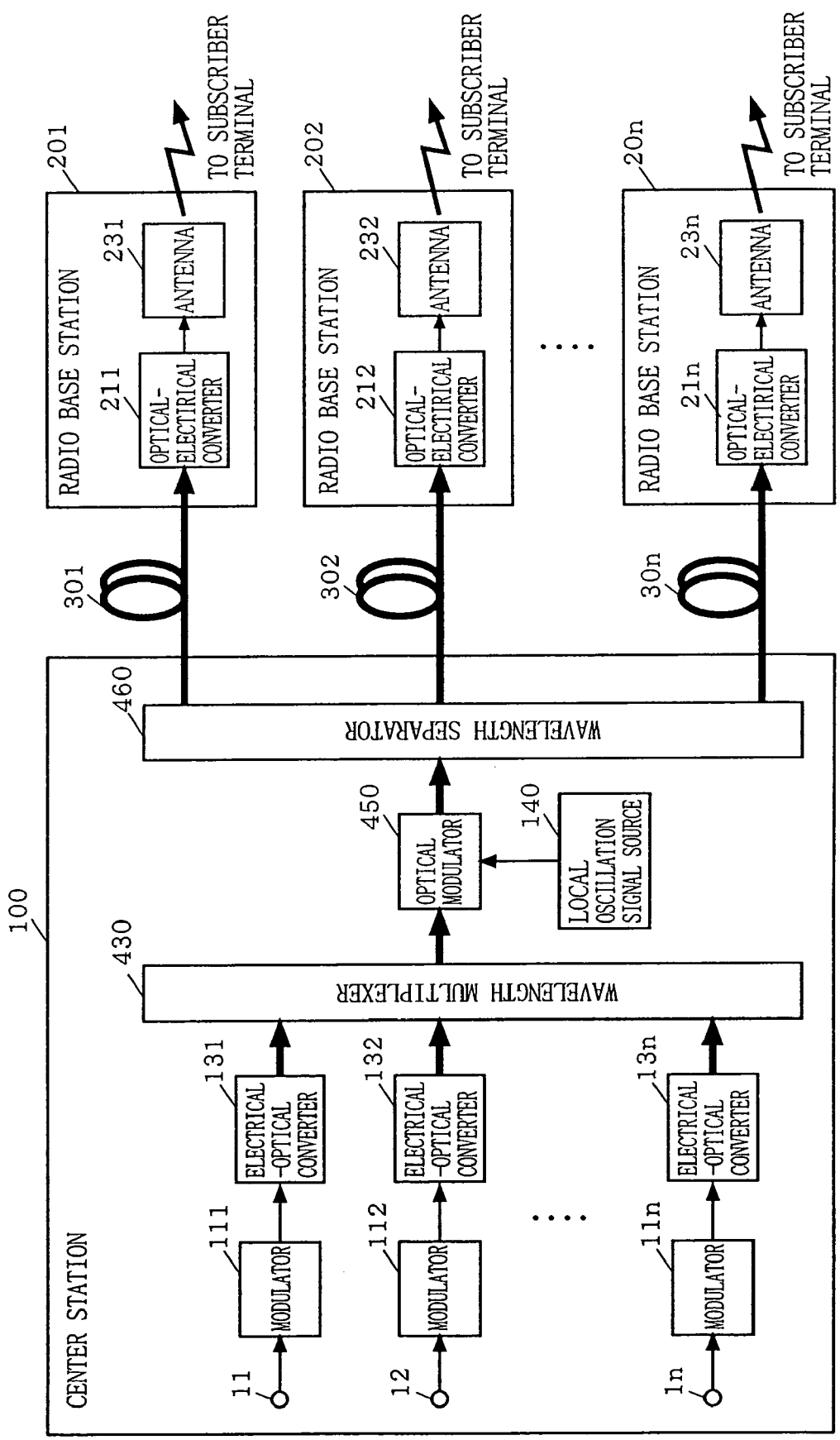
FIG. 6 is a block diagram showing the configuration of an optical transmission system according to a fourth embodiment of the present invention.

FIG. 6 is a block diagram showing the configuration of an optical transmission system for radio access according to a fourth embodiment of the present invention. In FIG. 6, in the optical transmission system according to the fourth embodiment, a center station 100 and a plurality of radio base stations 201 to 20$n$ are respectively connected to each other through a plurality of downstream optical fibers 301 to 30$n$.

The center station 100 includes a plurality of modulators 111 to 11$n$ and a plurality of electrical-optical converters 131 to 13$n$ respectively corresponding to the plurality of radio base stations 201 to 20$n$, a wavelength multiplexer 430, a local oscillation signal source 140, an optical modulator 450, and a wavelength separator 460. The radio base stations 201 to 20$n$ respectively include optical-electrical converters 211 to 21$n$ and antennas 231 to 23$n$. The operation of the optical transmission system according to the fourth embodiment will be described.

In the center station 100, information to be transmitted to the radio base station 20$k$ is inputted to an input terminal 1$k$ in the form of a baseband signal. The modulator 11$k$ modulates the baseband signal inputted from the input terminal 1$k$ into an IF signal having a predetermined frequency. The frequency is determined on the basis of the frequency of a radio signal transmitted to a subscriber terminal from the radio base station 20$k$. The electrical-optical converter 13$k$ converts the IF signal obtained by the modulation in the modulator 11$k$ into an optical signal through direct modulation. The wavelengths of the optical signals obtained by the conversion in the electrical-optical converters 131 to 13$n$ are previously assigned so as to differ. The electrical-optical converters 131 to 13$n$ are set such that the wavelengths of the optical signals are equally spaced, for example. The wavelength multiplexer 430 wavelength-multiplexes the optical signals having the different wavelengths respectively outputted from the electrical-optical converters 131 to 13$n$. The local oscillation signal source 140 outputs a local oscillation signal having a predetermined frequency $f_{LO}$. The frequency $f_{LO}$ of the local oscillation signal is determined on the basis of the modulation frequencies of the modulators 111 to 11$n$ and the frequencies of the radio signals to be respectively transmitted from the radio base stations 201 to 20$n$ to the subscriber terminals. The optical modulator 450 receives the optical signals wavelength-multiplexed in the wavelength multiplexer 430 and the local oscillation signal outputted from the local oscillation signal source 140, to collectively intensity-modulate the wavelength-multiplexed optical signals using the local oscillation signal. By the intensity modulation, it is possible to obtain the optical signal having an RF component obtained by optically converting the IF signal. The wavelength separator 460 separates the optical signals intensity-modulated by the optical modulator 450 into a plurality of optical signals depending on the wavelengths, and respectively transmits the corresponding optical signals to the radio base stations 201 to 20$n$ through the downstream optical fibers 301 to 30$n$.

The optical signals transmitted from the center station 100 are respectively inputted to the radio base stations 201 to 20$n$ after propagating through the downstream optical fibers 301 to 30$n$.

In the radio base station 20$k$, the optical-electrical converter 21$k$ converts the inputted optical signal into an electric signal, to output an RF signal. By the conversion, an RF signal obtained by frequency-converting an IF signal can be obtained. The outputted RF signal is released to space from the antenna 23$k$ to the subscriber terminal as a radio signal after only its desired frequency component is extracted therefrom.

As described above, in the optical transmission system according to the fourth embodiment of the present invention, only the IF signals having frequencies which are in close proximity to or identical to each other are respectively converted into light intensity modulated signals having different wavelengths. After the light intensity modulated signals are wavelength-multiplexed, they are collectively intensity-modulated using the local oscillation signal through external modulation. Since the plurality of IF signals are collectively optically frequency-converted into the RF signals, therefore, no electrical frequency converter is required, and the optical modulator for performing optical frequency conversion can be shared among the plurality of radio base stations, thereby making it possible to realize low-cost frequency conversion.

Furthermore, the optical signals which have been collectively intensity-modulated are respectively optically transmitted to the radio base stations even after being separated depending on the wavelengths. Even when the frequencies of the RF signals are the same, therefore, the RF signals can be transmitted without interfering with each other. In addition, the optical signals can be easily separated in a light wavelength region, thereby making it possible to provide a low-cost optical transmission system for radio access.

Although in the fourth embodiment, description was made of such a configuration that the wavelength separator 460 is installed in the center station 100, the wavelength separator 460 need not be necessarily installed in the center station 100. For example, the wavelength separator 460 may be installed in separated fashion as an independent relay station, or may be installed in each of the radio base stations 201 to 220$n$. In the latter case, however, such a configuration that the optical signal outputted from the optical modulator 450 is branched into optical signals, and the optical signals are respectively outputted to the radio base stations 201 to 20n must be newly provided in the center station 100.

Although description was made of a case where the IF signals inputted to the electrical-optical converters 131 to 13n are of one channel, multi-channel IF signals may be respectively inputted thereto, in which case the same effect is obtained. In this case, the IF signals on the channels may be inputted to the electrical-optical converters 131 to 13n after being frequency-division multiplexed.

Furthermore, in the fourth embodiment, the intensity modulation is doubly performed. Accordingly, it is possible to use a semiconductor laser which is only applicable to a relatively low frequency signal but is superior in distortion characteristics to an external modulator and an external modulator which operates to a high frequency, respectively, for intensity modulation of the IF signals wavelength-multiplexed (the electrical-optical converters 131 to 13n) and intensity modulation of the local oscillation signal (the optical modulator 450). Further, the frequency of the local oscillation signal is relatively high. Accordingly, an external modulator which has been matched in a particular high frequency band for modulation can be also used for the intensity modulation of the local oscillation signal. Further, it is also possible to use a Mach-Zehnder type external modulator for the intensity modulation of the local oscillation signal. When the Mach-Zehnder type external modulator is used, a bias point is set to a point at which light output power is the maximum or the minimum, thereby making it possible to perform optical frequency conversion at a frequency which is twice the frequency of the local oscillation signal. A method of setting the bias point cannot be used for the intensity modulation of the IF signals frequency-division multiplexed because a second-order distortion component is increased. However, it can be used for the intensity modulation of the local oscillation signal because the local oscillation signal is of only one carrier. Further, in this method, the frequency of the local oscillation signal used for the intensity modulation may be the frequency which is one-half of that in the normal frequency conversion. Accordingly, it is possible to use as a low-cost local oscillation signal source 140 and a low-cost optical modulator 450.

When an optical amplifier must be used in order to compensate for a branching loss and a transmission loss, a wavelength of 1.5 µm is used as the wavelength of a light source used for the electrical-optical converters 131 to 13n. At this time, the optical fiber which has already been laid is an SMF. When DSB modulation is used as a modulation scheme carried out in the optical modulator 450, and a high frequency signal in a microwave band or a millimeter wave band is optically transmitted by the SMF, the power of the high frequency signal after the optical transmission may be greatly reduced depending on the transmission distance by the effect of the dispersion of the SMF. In order to avoid the effect of the dispersion, optical SSB modulation with a carrier and a sideband component may be used for a modulation scheme carried out in the optical modulator 450. Accordingly, a Mach-Zehnder type external modulator may be used as the optical modulator 450, and a point at which light output power is the minimum or the maximum may be set to a bias point, to perform external modulation.

Fifth Embodiment

In the optical transmission system according to the fourth embodiment of the present invention, in the electrical-optical converters 131 to 13n, the IF signals are respectively converted into the optical signals through direct modulation. When the multi-channel IF signal is subjected to electrical-optical conversion, therefore, wavelength chirping occurs. When there is wavelength dispersion of the downstream optical fibers 301 to 30n, distortion due to wavelength dispersion is induced, thereby degrading the transmission characteristics.

In the fifth embodiment, description is made of an optical transmission system in which no wavelength chirping occurs.

Figure 7:
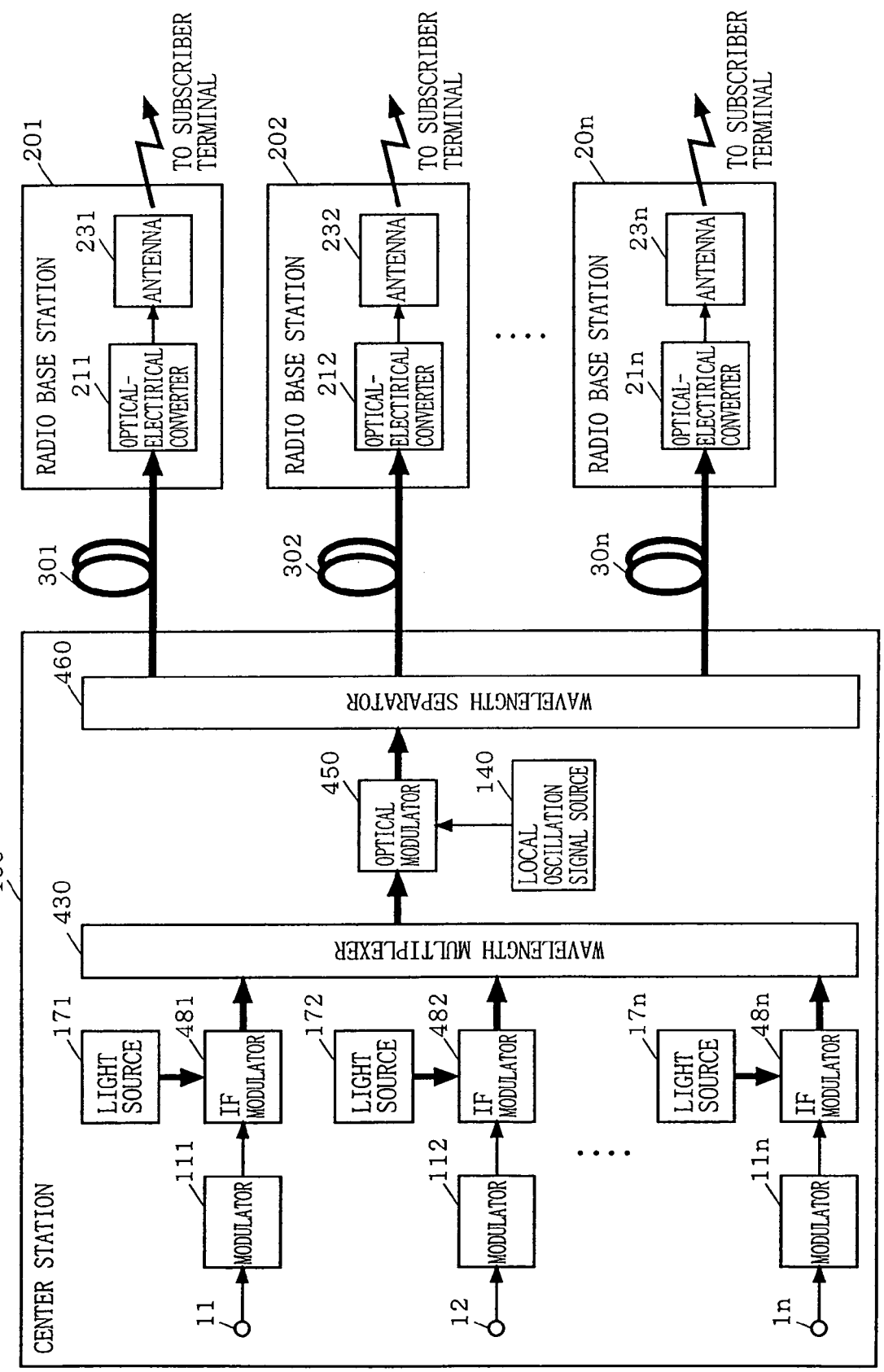
FIG. 7 is a block diagram showing the configuration of an optical transmission system according to a fifth embodiment of the present invention.

FIG. 7 is a block diagram showing the configuration of an optical transmission system for radio access according to a fifth embodiment of the present invention. In FIG. 7, in the optical transmission system according to the fifth embodiment, a center station 100 and a plurality of radio base stations 201 to 20n are respectively connected to each other through a plurality of downstream optical fibers 301 to 30n.

The center station 100 includes a plurality of modulators 111 to 11n, a plurality of light sources 171 to 17n, and a plurality of IF modulators 481 to 48n which respectively correspond to the plurality of radio base stations 201 to 20n, a wavelength multiplexer 430, a local oscillation signal source 140, an optical modulator 450, and a wavelength separator 460. The radio base stations 201 to 20n respectively include optical-electrical converters 211 to 21n and antennas 231 to 23n. In the optical transmission system according to the fifth embodiment, the same components as those in the optical transmission system according to the fourth embodiment are assigned the same reference numerals and hence, the description thereof is not repeated. In the optical transmission system according to the fifth embodiment, description is made centering on the operations of the different components.

The light sources 171 to 17n respectively output optical signals having different wavelengths. For example, the light sources 171 to 17n respectively output optical signals such that the wavelengths are equally spaced. The IF modulator 48k receives an IF signal modulated by the modulator 11k and the optical signal outputted from the light source 17k, and intensity-modulates the optical signal using the IF signal. The intensity-modulated optical signals are wavelength-multiplexed in the wavelength multiplexer 430. Thereafter, the multiplexed optical signals are respectively optically transmitted to the radio base stations 201 to 20n after being subjected to the above-mentioned processing.

As described above, in the optical transmission system according to the fifth embodiment shown in FIG. 7, the light sources 171 to 17n and the IF modulators 48a to 48n are used to convert the IF signals into optical signals through external modulation, so that no wavelength chirping occurs. Even when there is wavelength dispersion of the downstream optical fibers 301 to 30n, therefore, the signals can be transmitted without degrading transmission characteristics. The configuration as in the fifth embodiment is particularly useful for a case where the characteristics cannot be changed on the side of the optical fiber, for example, a system is newly constructed using the optical fiber which has already been laid.

Sixth Embodiment

The fourth and fifth embodiments were characterized by a case where information is transmitted from the center station 100 to the subscriber terminals (in the downstream direction). Accordingly, description was made of the optical transmission system comprising a configuration for only downstream transmission.

In the sixth embodiment, description is then made of an optical transmission system in which an RF signal in an optical signal state obtained by frequency-converting an IF signal is utilized for a case where information is transmitted from a subscriber terminal to a center station 100 (in an upstream direction), to simplify a configuration required for upstream transmission.

Figure 8:
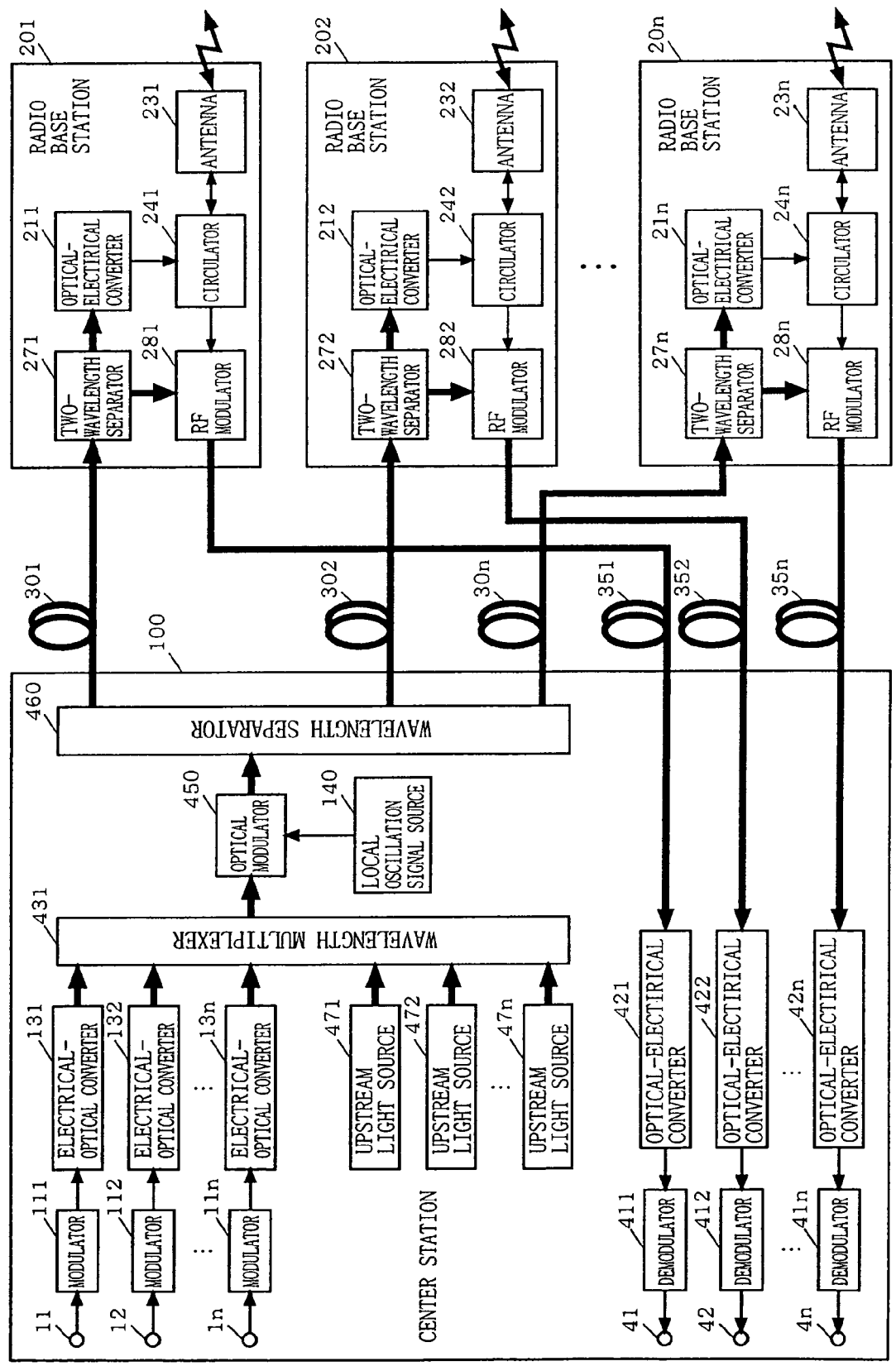
FIG. 8 is a block diagram showing the configuration of an optical transmission system according to a sixth embodiment of the present invention.

FIG. 8 is a block diagram showing the configuration of an optical transmission system for radio access according to a sixth embodiment of the present invention. In FIG. 8, in the optical transmission system according to the sixth embodiment, a center station 100 and a plurality of radio base stations 201 to 20n are respectively connected to each other through a plurality of downstream optical fibers 301 to 30n and a plurality of upstream optical fibers 351 to 35n.

The center station 100 includes a plurality of modulators 111 to 11n, a plurality of electrical-optical converters 131 to 13n, a plurality of upstream light sources 471 to 47n, a plurality of optical-electrical converters 421 to 42n, and a plurality of demodulators 411 to 41n respectively corresponding to the plurality of radio base stations 201 to 20n, a wavelength multiplexer 431, a local oscillation signal source 140, an optical modulator 450, and a wavelength separator 460. The radio base stations 201 to 20n respectively include two-wavelength separators 271 to 27n, RF modulators 281 to 28n, optical-electrical converters 211 to 21n, circulators 241 to 24n, and antennas 231 to 23n. In the optical transmission system according to the sixth embodiment, the same components as those in the optical transmission system according to the fourth embodiment are assigned to the same reference numerals and hence, the description thereof is not repeated. The optical transmission system according to the sixth embodiment will be described, centered on the operations of the different components.

Description is now made of the downstream transmission from the center station 100 to each of the radio base stations 201 to 20n.

The upstream light sources 471 to 47n respectively output optical signals used for transmitting upstream signals from the radio base stations 201 to 20n to the center station 100. Here, the upstream light sources 471 to 47n are set such that the wavelengths of the outputted optical signals differ from each other and also respectively differ from wavelengths previously assigned to the electrical-optical converters 131 to 13n. The wavelength multiplexer 431 wavelength-multiplexes the optical signals having the different wavelengths respectively outputted from the electrical-optical converters 131 to 13n and the optical signals having the different wavelengths respectively outputted from the upstream light sources 471 to 47n. The optical modulator 450 receives the optical signals wavelength-multiplexed by the wavelength multiplexer 431 and a local oscillation signal outputted from the local oscillation signal source 140, and collectively intensity-modulates the wavelength-multiplexed optical signals using the local oscillation signal. The wavelength separator 460 separates the optical signals intensity-modulated by the optical modulator 450 into a plurality of optical signals depending on the wavelengths, and respectively transmits the corresponding optical signals to the radio base stations 201 to 20n through the downstream optical fibers 301 to 30n. That is, the wavelength separator 460 transmits the optical signal outputted from the electrical-optical converter 13k and the optical signal outputted from the upstream light source 47k to the radio base station 20k through the downstream optical fiber 30k.

In the radio base station 20k, the two-wavelength separator 27k wavelength-separates the optical signal transmitted from the center station 100, and outputs the optical signal outputted from the electrical-optical converter 13k and the optical signal outputted from the upstream light source 47k, respectively, to the optical-electrical converter 21k and the RF modulator 28k. The optical-electrical converter 21k converts the optical signal wavelength-separated by the two-wavelength separator 27k into an electric signal. By the conversion, an RF signal obtained by frequency-converting an IF signal can be obtained. The RF signal is released to space from the antenna 23k to a subscriber terminal through the circulator 24k.

Description is now made of the upstream transmission from each of the radio base stations 201 to 20n to the center station 100.

An RF signal transmitted from the subscriber terminal is received by the antenna 23k. The received RF signal is outputted to the RF modulator 28k through the circulator 24k. In the present invention, therefore, the circulator 24k is provided between the optical-electrical converter 21k and the antenna 23k, so that the antenna 23k is shared between the upstream transmission and the downstream transmission. The RF modulator 28k receives the optical signal wavelength-separated by the two-wavelength separator 27k and the RF signal received by the antenna 23k, and intensity-modulates the optical signal using the RF signal. The optical signal intensity-modulated by the RF modulator 28k is outputted to the center station 100 through the upstream optical fiber 35k.

The optical signal outputted from the radio base station 20k is inputted to the center station 100 upon propagating through the upstream optical fiber 35k.

In the center station 100, the optical-electrical converter 42k converts the inputted optical signal into an electric signal. By the conversion, an IF signal obtained by frequency-converting the RF signal can be obtained. The demodulator 41k demodulates the IF signal obtained by the conversion in the optical-electrical converter 42k to a baseband signal, and outputs the baseband signal from an output terminal 4k.

In the radio base station 20k, the optical signal in the upstream light source 47k which is outputted to the RF modulator 28k is intensity-modulated using the local oscillation signal generated by the local oscillation signal source 140 in the optical modulator 450 provided in the center station 100. In the RF modulator 28k, therefore, the wavelength-separated optical signal is intensity-modulated using the received RF signal in the RF modulator 28k, so that the optical signal is doubly intensity-modulated using the local oscillation signal and the RF signal. Accordingly, the optical signal propagating from the RF modulator 28k in the radio base station 20k is received by the optical-electrical converter 42k in the center station 100 and is detected, so that mixing of both the signals is performed, and the RF signal is frequency-converted into the IF signal.

In the sixth embodiment, in order to transmit the radio signal received by the antenna 23k, the optical signal outputted from the upstream light source 47k, together with the optical signal outputted from the electrical-optical converter 13k, is intensity-modulated in the optical modulator 450, and is then used for the intensity modulation in the RF modulator 28k. Consequently, the RF signal is frequency-converted into the IF signal in the optical-electrical converter 42k, so that the number of devices for high-frequency signal processing can be reduced.

Figure 9:
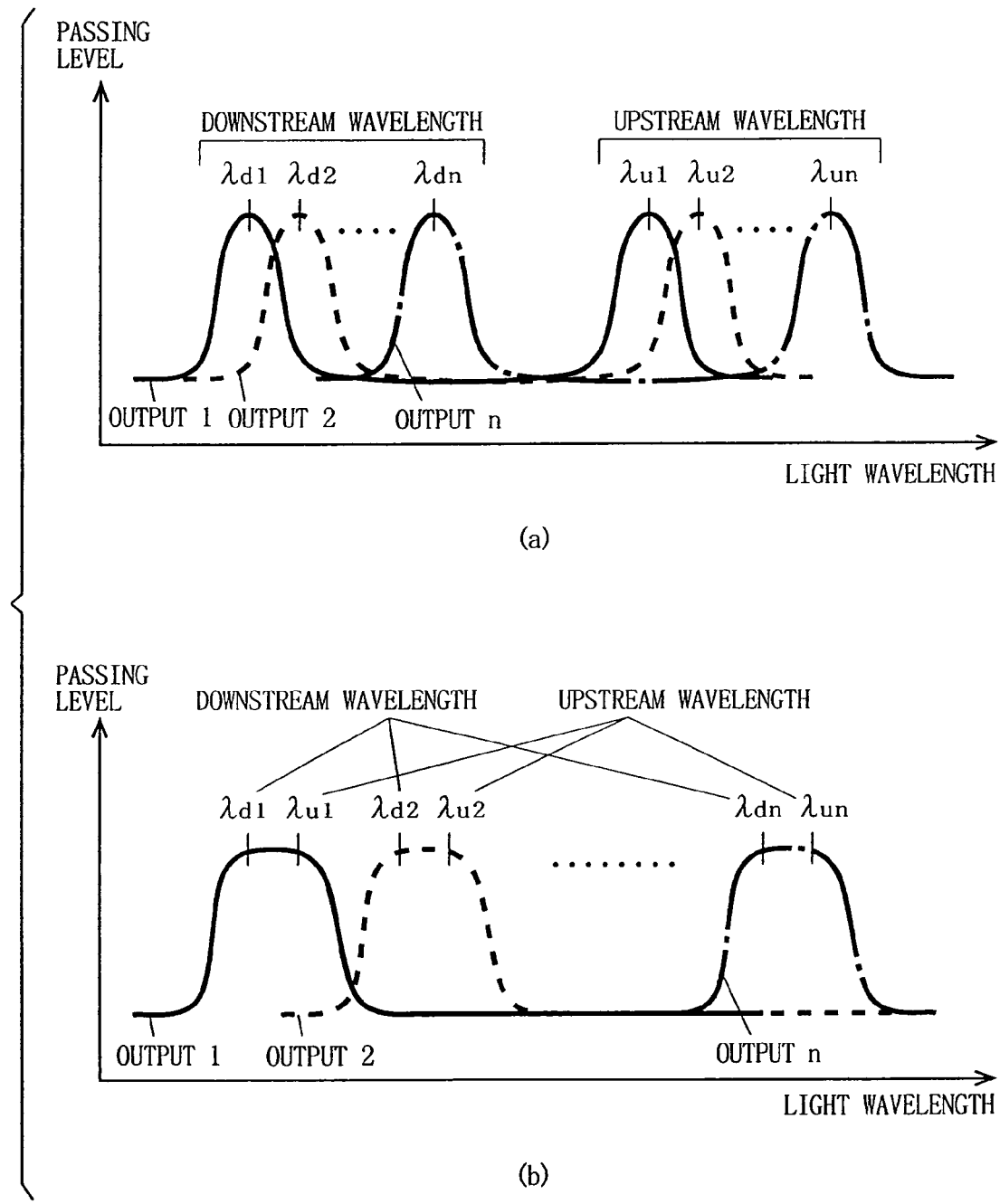
FIG. 9 shows diagrams each for explaining an example of a wavelength separating operation performed in a wavelength separator 460.

Referring now to FIG. 9, a wavelength separating operation performed in the wavelength separator 460 in the center station 100 will be described by taking a specific example.

An n output wavelength separator for separating n optical signals multiplexed at equal spacing in wavelength, for example, can be used for the wavelength separator 460. It is possible to use, as the n output wavelength separator, for example, an arrayed waveguide grating (AWG) separator introduced in "Wavelength Multiplexing Optical Semiconductor Component" (written by Yoshikuni et al.) reported in a magazine "O plus E" published in November 1997. The n output wavelength separator having an AWG structure has a periodic wavelength passband when it is viewed from one output terminal.

As shown in (a) of FIG. 9, when the n output wavelength separator is used, therefore, the wavelength λdk of the optical signal outputted from the electrical-optical converter 13k and the wavelength λuk of the optical signal outputted from the upstream light source 47k are previously adjusted so as to coincide with the periodic wavelength passband of the corresponding output terminal. Consequently, the optical signals having the two different wavelengths λdk and λuk respectively outputted from the electrical-optical converter 13k and the upstream light source 47k can be together taken out of the same output terminal.

On the other hand, not the above-mentioned n output wavelength separator having the periodic wavelength passband but a separator having a wavelength passband having a predetermined width can be also used as the wavelength separator 460 when it is viewed from one output terminal. When such a separator is used, as shown in (b) of FIG. 9, the wavelength λdk of the optical signal outputted from the electrical-optical converter 13k and the wavelength λuk of the optical signal outputted from the upstream light source 47k are previously adjusted so as to be in close proximity to each other within the wavelength passband of the output terminal. Consequently, the optical signals having the two different wavelengths λdk and λuk respectively outputted from the electrical-optical converter 13k and the upstream light source 47k can be together taken out of the same output terminal.

Figure 10:
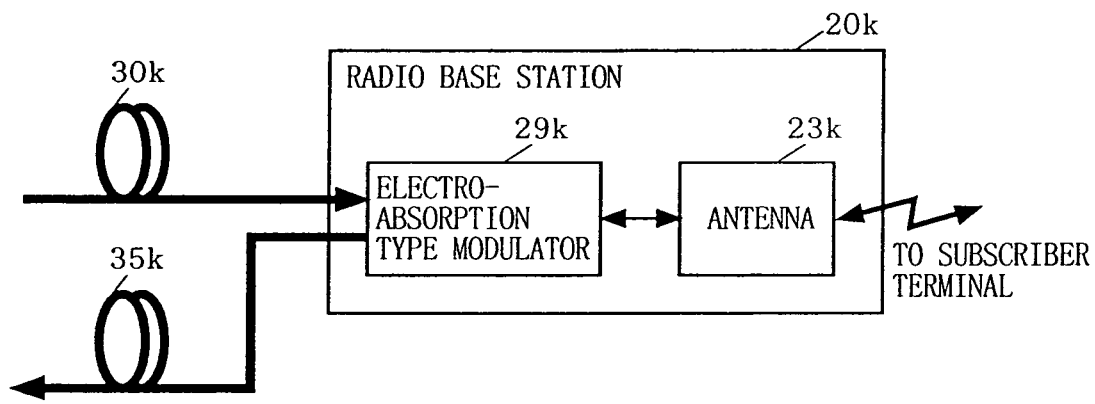
FIG. 10 is a block diagram showing another example of the configurations of radio base stations 210 to 20$n$ shown in FIG. 8.
Figure 11:
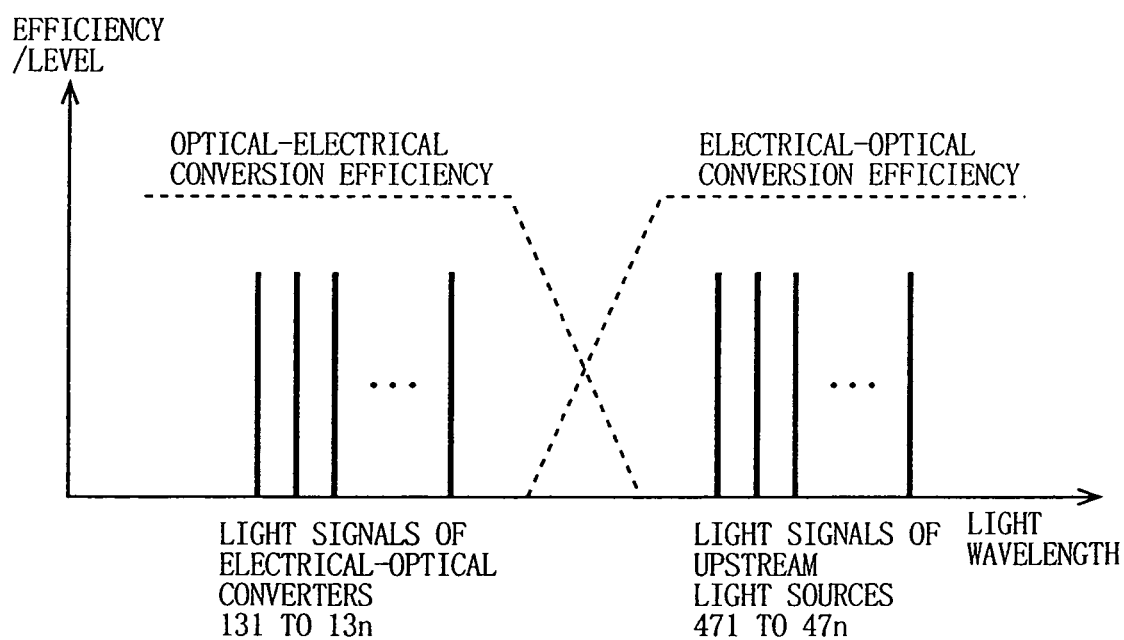
FIG. 11 is a diagram showing an example of optical-electrical conversion efficiency and electrical-optical conversion efficiency obtained in a field effect absorption type modulator 29$k$ shown in FIG. 10.

Referring to FIGS. 10 and 11, another configuration used for each of the radio base stations 201 to 20n will be described.

FIG. 10 is a block diagram showing the configuration of the radio base station 20k using an electro-absorption type modulator 29k in place of the two-wavelength separator 27k, the optical-electrical converter 21k, the circulator 24k and the RF modulator 28k in the radio base station 20k shown in FIG. 8. The electro-absorption type modulator 29k is a device having both an optical-electrical conversion function and an electrical-optical conversion function. Accordingly, the configuration of the radio base station 20k can be simplified, as shown in FIG. 10. The electro-absorption type modulator 29k is described in "Full-Duplex Fiber-Optic RF Subcarrier Transmission Using a Dual-Function Modulator/Demodulator" (Andreas Stöhr, et al.) reported in a document "IEEE Trans. Microwave Theory Tech. Vol. 47, No. 7" published in 1999, for example.

The optical-electrical conversion efficiency and the electrical-optical conversion efficiency of the electro-absorption type modulator 29k have wavelength dependency and are such characteristics that high efficiency is obtained in different wavelength areas, as indicated by a dotted line in FIG. 11. Consequently, suitable wavelength setting is performed such that optical signals to be subjected to optical-electrical conversion which are outputted from the electrical-optical converters 131 to 13n and optical signals to be subjected to electrical-optical conversion which are outputted from the upstream light sources 471 to 47n are respectively arranged on the side of a short wavelength and a long wavelength (FIG. 11), thereby making it possible to make effective use of the electro-absorption type modulator 29k.

As described above, in the optical transmission system according to the sixth embodiment of the present invention, in order to transmit the radio signal received by the radio base station to the center station, the radio signal can be frequency-converted into the IF signal as an optical signal state by wavelength-multiplexing a plurality of unmodulated light having different wavelengths on a downstream optical signal and previously externally modulating the light signal using the local oscillation signal. Consequently, no electric frequency converter is required for the radio base station, and an optical modulator for optically performing frequency conversion can be shared among the plurality of radio base stations. Further, the light source need not be installed in the radio base station, so that the optical transmission system can be easily maintained. Further, the electro-absorption type modulator is used for optical receiving and optical modulation, thereby making it possible to simplify the configuration of the radio base station.

Seventh Embodiment

As described above, in a center station 100 in an optical transmission system according to the present invention, an inputted IF signal is converted into an optical signal through direct modulation in an electrical-optical converter (e.g., a semiconductor laser), and the optical signal is further intensity-modulated again using a local oscillation signal in an external modulator.

Letting cos(ωt) be the IF signal, sin(ω0t) be the optical signal, m be the degree of optical modulation at the time of direct modulation, β1 be a light frequency modulation index based on the IF signal, and βL0 be a light phase modulation index at the time of external modulation, the doubly modulated optical signal (electric field representation; E(t)) is expressed by the following equation (1):

$$E(t) = \sqrt{[\{1 + J1(\beta L0)\cos(\omega L0 t)\}\{1 + m\cos(\omega(t - \tau 1))\}]} * \quad (1)$$
$$\sin[\omega 0 t + \beta 1 \sin(\omega t)]$$
$$= \sqrt{[1 + m\cos(\omega(t - \tau 1)) + J1(\beta L0)\cos(\omega L0 t) +}$$
$$mJ1(\beta L0)\cos(\omega L0 t)\cos(\omega(t - \tau 1))] *$$
$$\sin[\omega 0 t + \beta 1 \sin(\omega t)]$$

As apparent from the foregoing equation (1), the doubly modulated optical signal E(t) has a light-intensity modulation component obtained by frequency-modulating a modulation frequency (ω) by the electrical-optical converter by a modulation frequency (ωL0) by the external modulator.

Generally, the electrical-optical modulator, such as the semiconductor laser, has lower distortion characteristics but has a relatively narrower frequency band, as compared with the external modulator. Contrary to this, the external modulator has broad-band characteristics but has inferior distortion characteristics. Consequently, the electrical-optical converter and the external modulator are connected in cascade, thereby making it possible to make use of low distortion characteristics of the electrical-optical converter and wide band characteristics of the external modulator. Therefore, it is possible to realize low distortion transmission of a high frequency signal.

In a case where the electrical-optical converter and the external modulator are simply connected in cascade, however, wavelength distortion is induced in an optical signal outputted from a light source for direct modulation by the exertion of a light frequency modulation component (wavelength chirping) and wavelength dispersion characteristics on the optical signal. Particularly, transmission characteristics of the optical signal are greatly degraded at the time of long-distance transmission.

In the seventh embodiment, therefore, description is made of a high frequency optical transmitter, which is applicable to the center station 100, in which a light frequency modulation component of a directly modulated optical signal is suppressed, and transmission characteristics are not degraded at the time of long-distance transmission.

Figure 12:
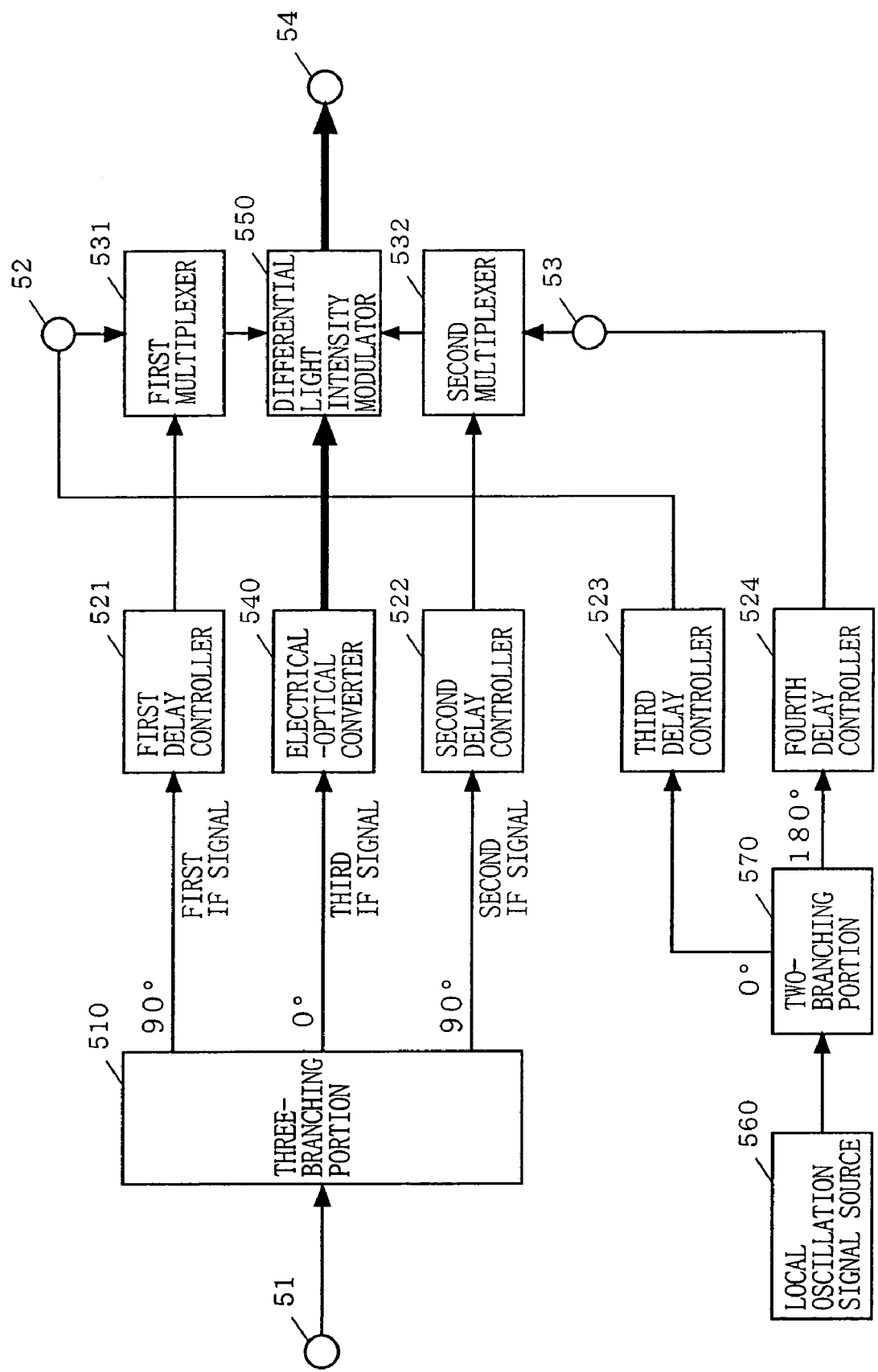
FIG. 12 is a block diagram showing the configuration of a high frequency optical transmitter according to a seventh embodiment of the present invention.

FIG. 12 is a block diagram showing the configuration of a high frequency optical transmitter according to a seventh embodiment of the present invention. In FIG. 12, the high frequency optical transmitter according to the seventh embodiment includes a three-branching portion 510, first to fourth delay controllers 521 to 524, first and second multiplexers 531 and 532, an electrical-optical converter 540, a differential light-intensity modulator 550, a local oscillation signal source 560, and a two-branching portion 570.

The high-frequency optical transmitter is applicable in place of the configurations of the electrical-optical converter 130, the local oscillation signal source 140, and the external modulator 150 in each of the center stations 100 in the first and third embodiments, and is applicable in place of the configurations of the light source 170, the local oscillation signal source 140, the external modulator 150, the optical branching portion 160, and the corresponding IF modulator 18k in the center station 100 in the second embodiment. The high frequency optical transmitter is applicable by inputting the signal obtained by multiplexing the IF signals outputted from the plurality of modulators 111 to 11n to an IF input terminal 51, inputting the optical signal outputted by the wavelength multiplexer 430 or 431 to the differential light-intensity modulator 550 as an optical signal outputted from the electrical-optical converter 540, and inputting an output signal of an output terminal 54 to the wavelength separator 460 in the center station 100 in each of the fourth to sixth embodiments. The operation of the high frequency optical transmitter according to the seventh embodiment of the present invention will be described.

An IF signal having an intermediate frequency inputted from the IF input terminal 51 is branched into first to third IF signals in the three-branching portion 510. The first and second IF signals and the third IF signal are respectively inputted to the first and second delay controllers 521 and 522 and the electrical-optical converter 540. The first and second IF signals are set so as to be the same in phase and differ in phase by 90° from the third IF signal.

The third IF signal is converted into an optical signal by direct modulation in the electrical-optical converter 540 and is outputted. At this time, the directly modulated optical signal outputted from the electrical-optical converter 540 is subjected to light intensity modulation as well as light frequency modulation, and its electric field representation: ELD(t) is given by the following equation (2), letting cos(ωt) be the IF signal, sin(ω0t) be the optical signal, m be the degree of optical modulation, and β1 be a frequency modulation index based on the IF signal:

$$ELD(t)=\sqrt{[1+m\cos(\omega t)]}\sin[\omega 0t+\beta 1\sin(\omega t)] \quad (2)$$

On the other hand, the first IF signal is outputted to one terminal of the first multiplexer 531 after the amount of propagation delay is adjusted to a predetermined value by the first delay controller 521. Similarly, the second IF signal is outputted to one terminal of the second multiplexer 532 after the amount of propagation delay is adjusted to a predetermined value by the second delay controller 522.

A local oscillation signal outputted from the local oscillation signal source 560 is branched into first and second local oscillation signals which differ in phase by 180° in the two-branching portion 570. The first local oscillation signal is outputted to the other terminal of the first multiplexer 531 after the amount of propagation delay is adjusted in the third delay controller 523 such that it is equal in propagation time to the first IF signal. Further, the second local oscillation signal is outputted to the other terminal of the second multiplexer 532 after the amount of propagation delay is adjusted in the fourth delay controller 524 such that it is equal in propagation time to the second IF signal. The first multiplexer 531 multiplexes the first IF signal and the first local oscillation signal, and the second multiplexer 532 multiplexes the second IF signal and the second local oscillation signal. Respective multiplexed signals are outputted to the differential light-intensity modulator 550.

Figure 13:
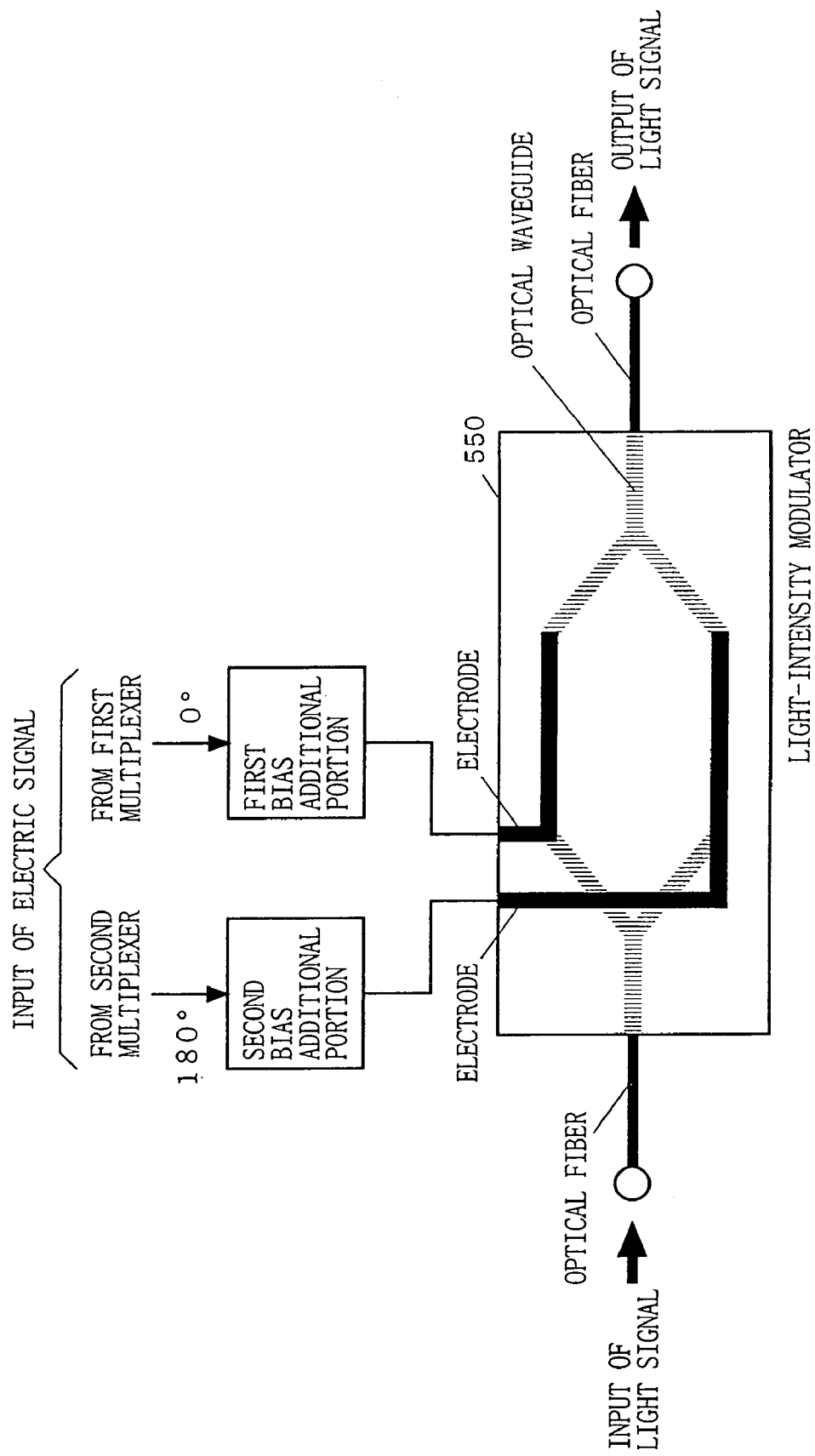
FIG. 13 is a block diagram showing the specific configuration of a differential light-intensity modulator 550 shown in FIG. 12.

The differential light-intensity modulator 550 is a Mach-Zehnder type modulator having two optical waveguides, as illustrated in FIG. 13, and is so constructed as to respectively apply voltage signals to electrodes provided in correspondence with the optical waveguides, change the refractive index of each of the optical waveguides to provide the difference in propagation time of light to optical signals, and then multiplex the optical signals. At this time, a bias voltage is applied to each of the electrodes such that the difference in propagation time of light passing through the two optical waveguides is converted into π/2 in terms of light phase, and the first and second local oscillation signals are respectively applied to the electrodes in opposite phases.

Letting cos(ωL0t) be the local oscillation signal, and βL0 be both light phase modulation indexes based on the first and second local oscillation signals in the differential light-intensity modulator 550, the optical signal (electric field representation: EEMi(t)) outputted from the differential light-intensity modulator 550 is expressed by the following equation (3) when no IF signal is inputted:

$$EEMi(t) = \sqrt{\begin{bmatrix} \{1 + J1(2\beta L0)\cos(\omega L0t)\} \\ \{1 + m\cos(\omega(t - \tau 1))\} \end{bmatrix}} * \quad (3)$$
$$\sin[\omega 0t + \beta 1\sin(\omega t)]$$
$$= \sqrt{\begin{bmatrix} 1 + m\cos(\omega(t - \tau 1)) + \\ J1(2\beta L0)\cos(\omega L0t) + \\ mJ1(2\beta L0)\cos(\omega L0t)\cos(\omega(t - \tau 1)) \end{bmatrix}} *$$
$$\sin[\omega 0t + \beta 1\sin(\omega t)]$$

From the foregoing equation (3), it is found that the optical signal outputted from the differential light-intensity modulator 550 has a light-intensity modulation component obtained by converting a modulation frequency (ω) by the electrical-optical converter 540 by a modulation frequency (ωL0) by the differential light-intensity modulator 550.

Then consider a case where only IF signals are inputted to the differential light-intensity modulator 550.

In this case, the first and second IF signals are respectively applied to the electrodes of the differential light-intensity modulator 550 in the same phase. Letting τ1 be a time period elapsed from the time when the third IF signal is outputted from the three-branching portion 510 until it propagates to the differential light-intensity modulator 550 after being converted into an optical signal in the electrical-optical converter 540, and τ2 be both time periods respectively elapsed from the time when the first and second electric signals are outputted from the three-branching portion 510 until they propagate to modulate the optical signals in the differential light-intensity modulator 550, and β2 be light phase modulation indexes based on the first and second IF signals in the differential light intensity modulator 550, the optical signal (electric field representation: EEMp(t)) outputted from the differential light-intensity modulator 550 is expressed by the following equation (4) when no local oscillation signal is inputted.

$$EEMp(t)=\sqrt{[1+m\cos(\omega(t-\tau 1))]} \sin [\omega 0t+\beta 1 \sin (\omega(t-\tau 1))+\beta 2 \cos [\omega(t-\tau 2)+\pi/2]] \quad (4)$$

In the first and second delay controllers 521 and 522, when the amount of delay is adjusted such that τ2=τ1, the foregoing equation (4) is changed into the following equation (5):

$$EEMp(t)=\sqrt{[1+m\cos(\omega(t-\tau 1))]} \sin [\omega 0t+(\beta 1-\beta 2)*\sin(\omega(t-\tau 1))] \quad (5)$$

From the foregoing equation (5), the light frequency modulation index β1 caused by direct modulation can be decreased to β1−β2 using double modulation by the differential light-intensity modulator 550. Further, the frequency modulation component of the optical signal can be completely removed by making the phase modulation index β2 equal to β1.

As described above, when both the local oscillation signal and the IF signal are inputted to the differential light-intensity modulator 550, the optical signal (electric field representation: EEM(t)) outputted from the output terminal 54 is expressed by the following equation (6) when β2=β1:

$$EEM(t) = \sqrt{\begin{bmatrix} \{1+J1(2\beta L0)\cos(\omega L0t)\} \\ \{1+m\cos(\omega(t-\tau 1))\} \end{bmatrix}} * \sin(\omega 0t)$$

$$= \sqrt{[\{1+m\cos(\omega(t-\tau 1))+J1(2\beta L0)\cos(\omega L0t)+mJ1(2\beta L0)\cos(\omega L0t)\cos(\omega(t-\tau 1))]}\sin(\omega 0t) \quad (6)$$

As apparent from the foregoing equation (6), a light frequency modulation component caused in the electrical-optical converter 540 is removed from the optical signal outputted from the differential light-intensity modulator 550 and at the same time, the optical signal has a light-intensity modulation component obtained by frequency-converting the modulation frequency (ω) by the electrical-optical converter 540 by the modulation frequency (ωL0) by the differential light-intensity modulator 550.

Figure 14:
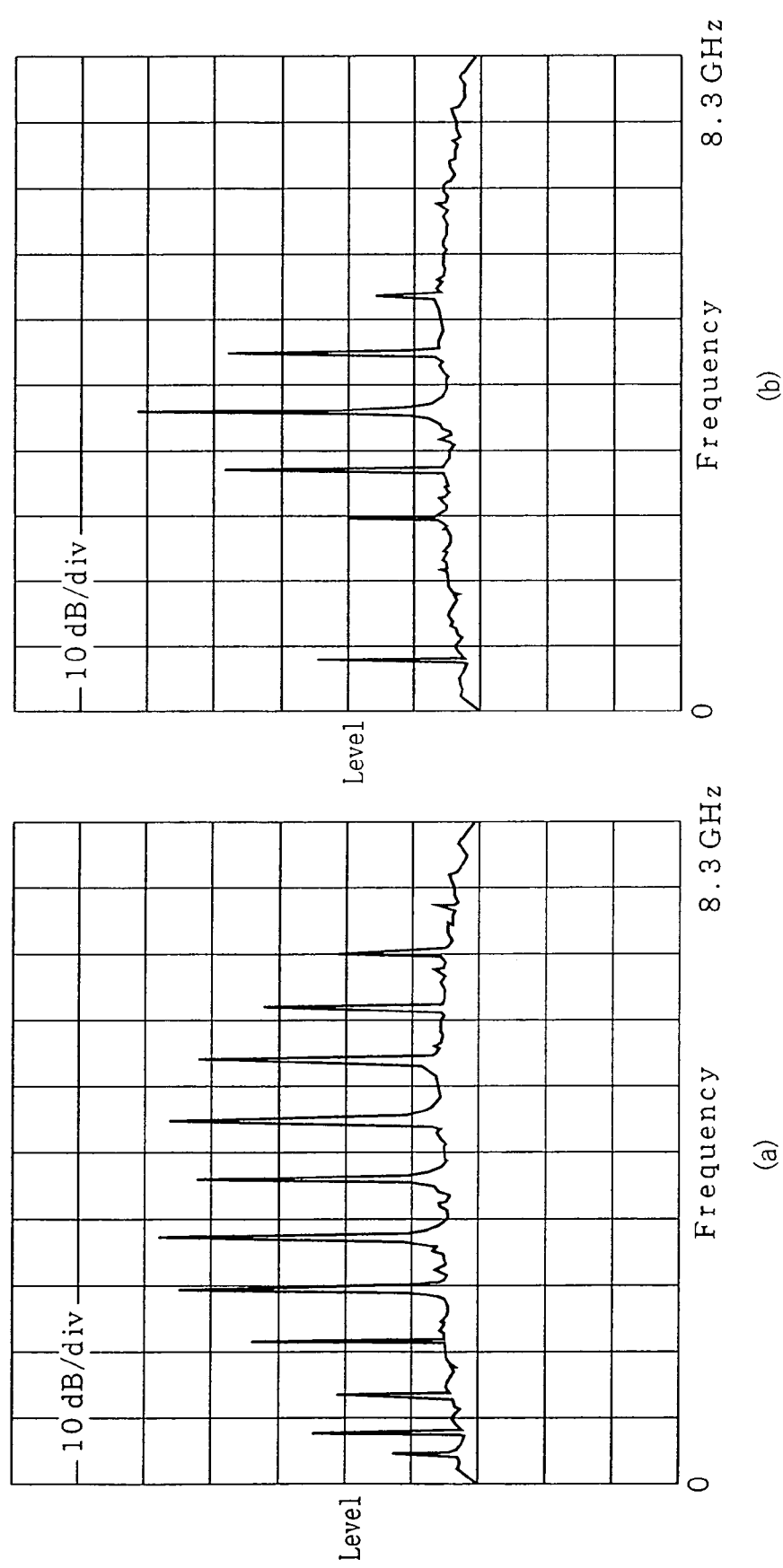
FIG. 14 shows diagrams each illustrating an example of a light spectrum measured using the high frequency optical transmitter according to the seventh embodiment of the present invention.

FIG. 14 illustrates an example in which a light frequency modulation component caused by direct modulation is actually suppressed by external modulation. Illustrated in (a) of FIG. 14 is a light spectrum with the light frequency modulation component caused by the direct modulation, while illustrated in (b) of FIG. 14 is a light spectrum with the light frequency modulation component canceled by the external modulation. In FIG. 14, no local oscillation signal is inputted to the differential light intensity modulator 550. From FIGS. 14(a) and 14(b), it can be confirmed that the light frequency modulation component can be suppressed by using the high frequency optical transmitter according to the seventh embodiment.

Description was made of an example in which the same local oscillation signals having a phase difference of 180° are respectively inputted to two local oscillation input terminals 52 and 53. At this time, the light spectrum is an optical double-sideband (DSB) signal having upper and lower double-sidebands, as shown in (a) of FIG. 15. Generally, the optical fiber has such wavelength dispersion characteristics that it varies in group speed depending on the light wavelength (the light frequency). When the optical DSB signal is transmitted, therefore, the group speeds of the upper sideband and the lower sideband do not coincide with each other, and a phase difference occurs in electric signal components respectively obtained as beat components of the upper sideband and a light carrier and the lower sideband and a light carrier at the time of square detection by the optical receiver. Particularly at the time of long-distance transmission, both the electric signals may be canceled upon being opposite in phase.

Figure 15:
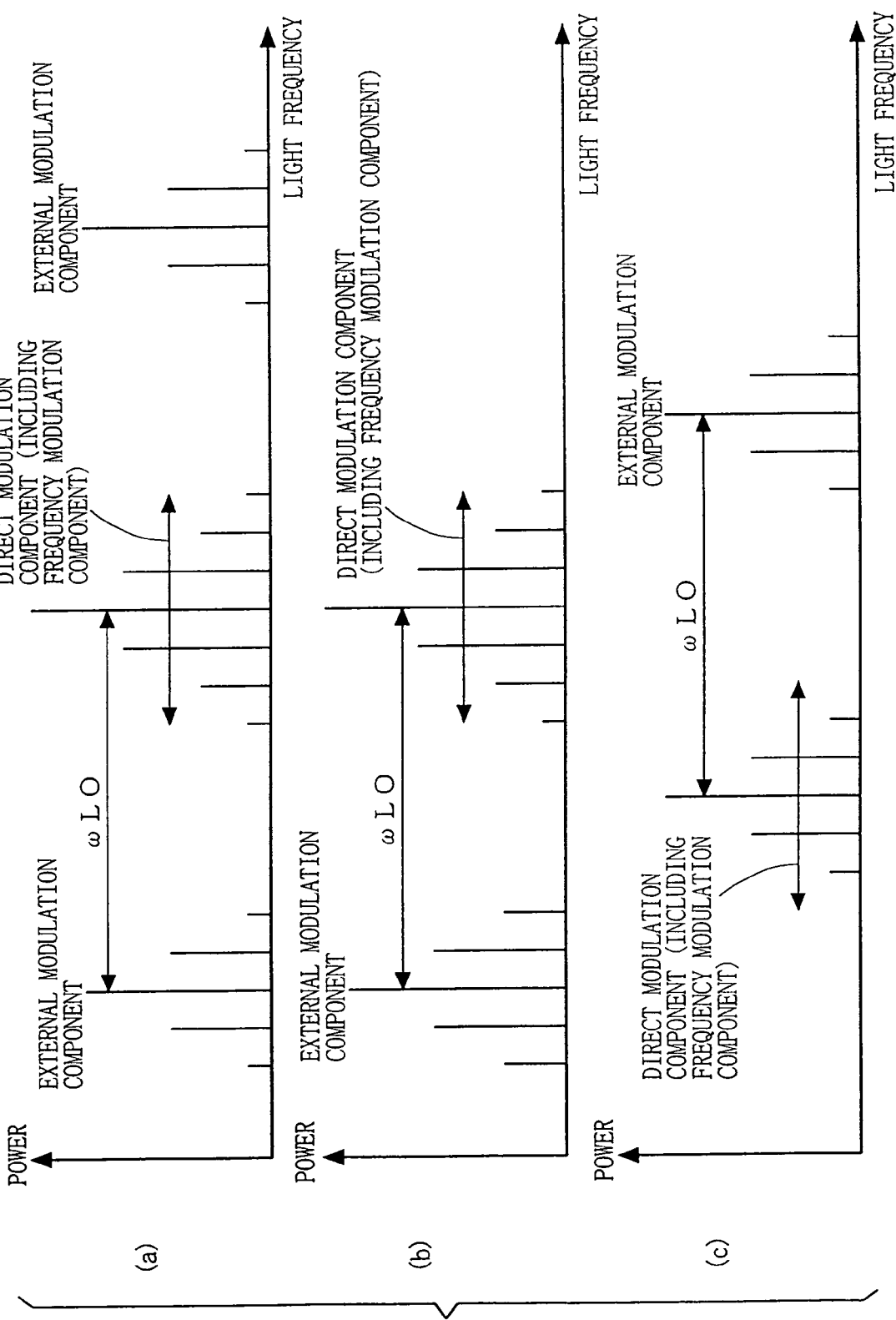
FIG. 15 shows diagrams each showing the difference between light spectra in a case where different external modulation schemes are used in the high frequency optical transmitter according to the seventh embodiment of the present invention.

Examples of a method of avoiding the phenomenon include an optical double-sideband (SSB) modulation scheme with only a single-sideband, as shown in (b) of FIG. 15, and an optical double-sideband (DSB-SC) modulation scheme with a light carrier suppressed, as shown in (c) of FIG. 15. In the above-mentioned configuration of the seventh embodiment, the local oscillation signals having a phase difference 90° are respectively inputted to first and second local oscillation input terminals 52 and 53, thereby making it possible to easily realize optical SSB modulation. Further, a bias voltage is applied such that the difference in propagation time of light passing through two optical waveguides in the differential light-intensity modulator 550 is π in terms of light phase, and local oscillation signals having a phase difference 180° are respectively inputted to the first and second local oscillation input terminals 52 and 53, thereby making it possible to easily realize optical DSB-SC modulation. In the case of the optical DSB modulation and the optical DSB-SC modulation, the local oscillation signal may be inputted to only one of the two terminals in the differential light-intensity modulator 550, in which case the same effect is obtained.

As described above, according to the high-frequency optical transmitter according to the seventh embodiment of the present invention, the differential light-intensity modulator 550 is caused to perform a light phase modulating operation, thereby making it possible to cancel the light frequency modulation component caused at the time of direct modulation using the IF signal and at the same time, frequency-convert the electric signal into the high frequency signal by the light-intensity modulating operation using the local oscillation signal. Consequently, the differential light-intensity modulator 550 can have two functions, that is, an optical frequency conversion function and a function of canceling frequency modulation, thereby making it possible to obtain good transmission characteristics even when the high frequency signal is transmitted a long distance by an optical fiber having dispersion characteristics.

Eighth Embodiment

Figure 16:
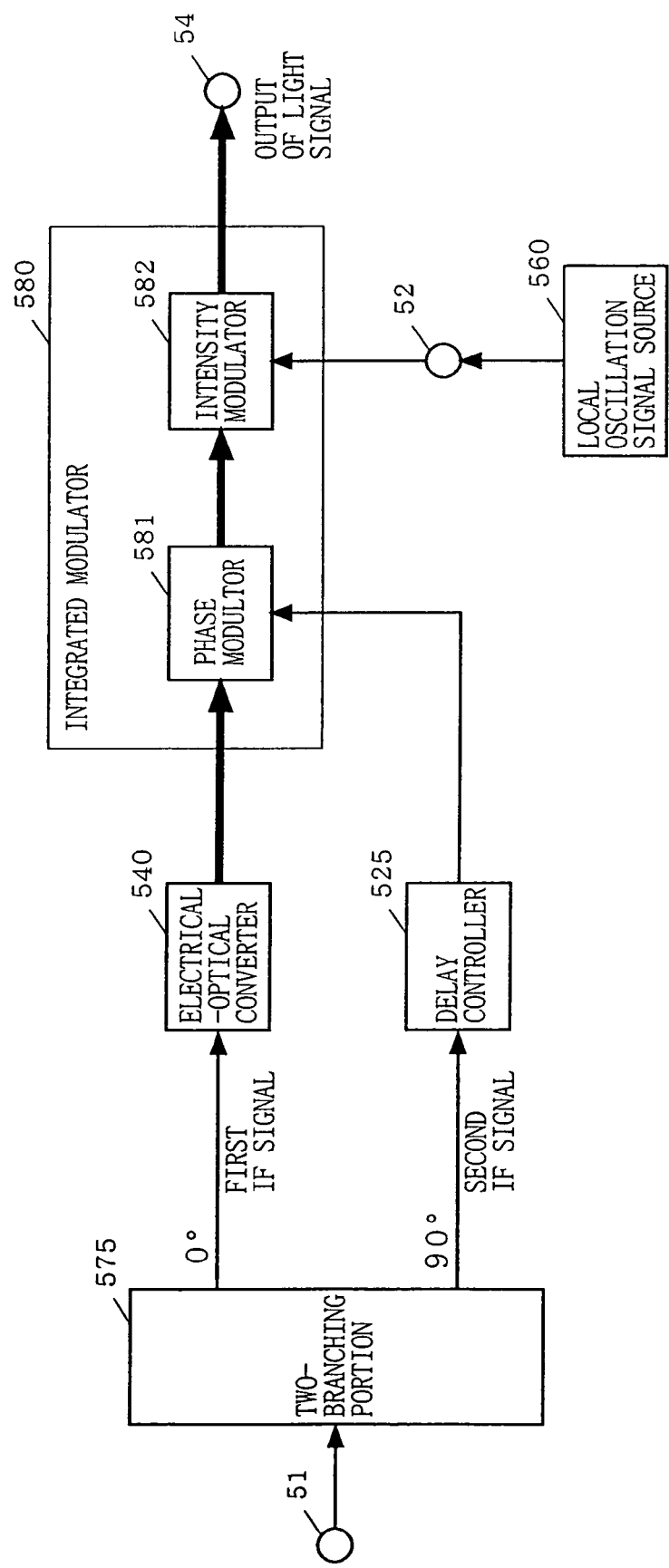
FIG. 16 is a block diagram showing the configuration of a high frequency optical transmitter according to an eighth embodiment of the present invention.
Figure 17:
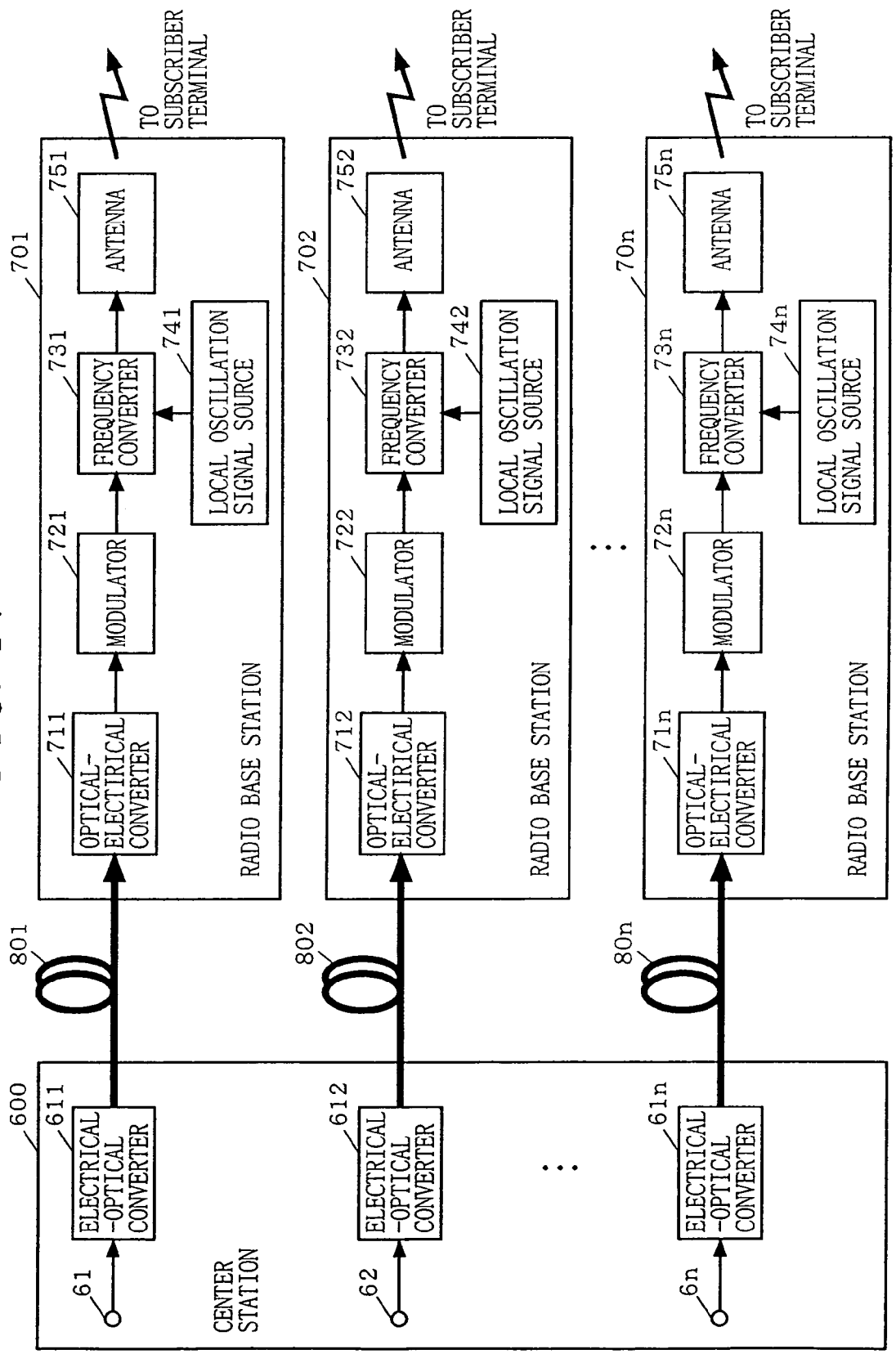
FIG. 17 is a block diagram showing the configuration of a conventional optical transmission system.
Figure 18:
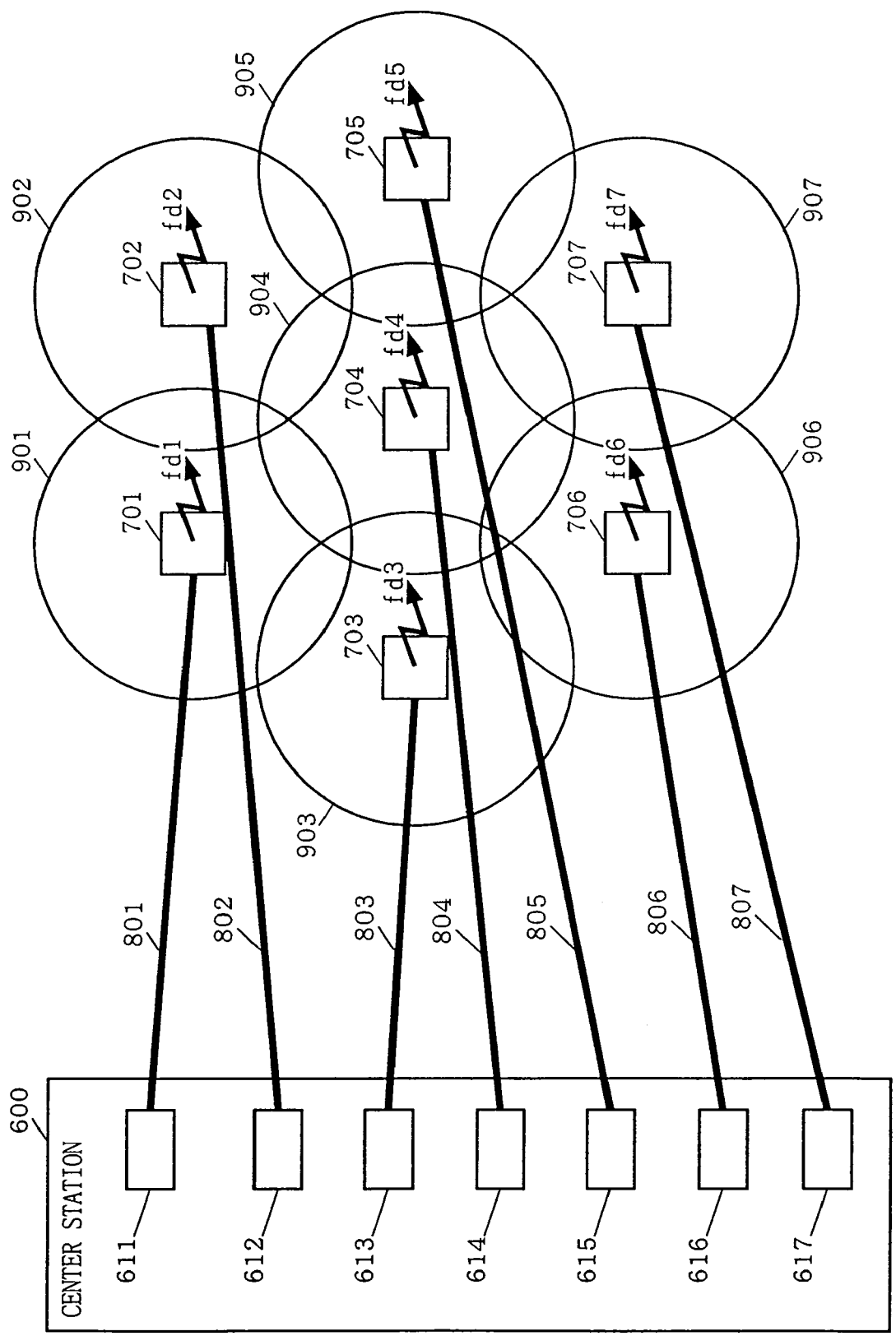
FIG. 18 is a diagram showing the concept of service areas 901 to 907 respectively covered by a plurality of radio base stations 701 to 707.
Figure 19:
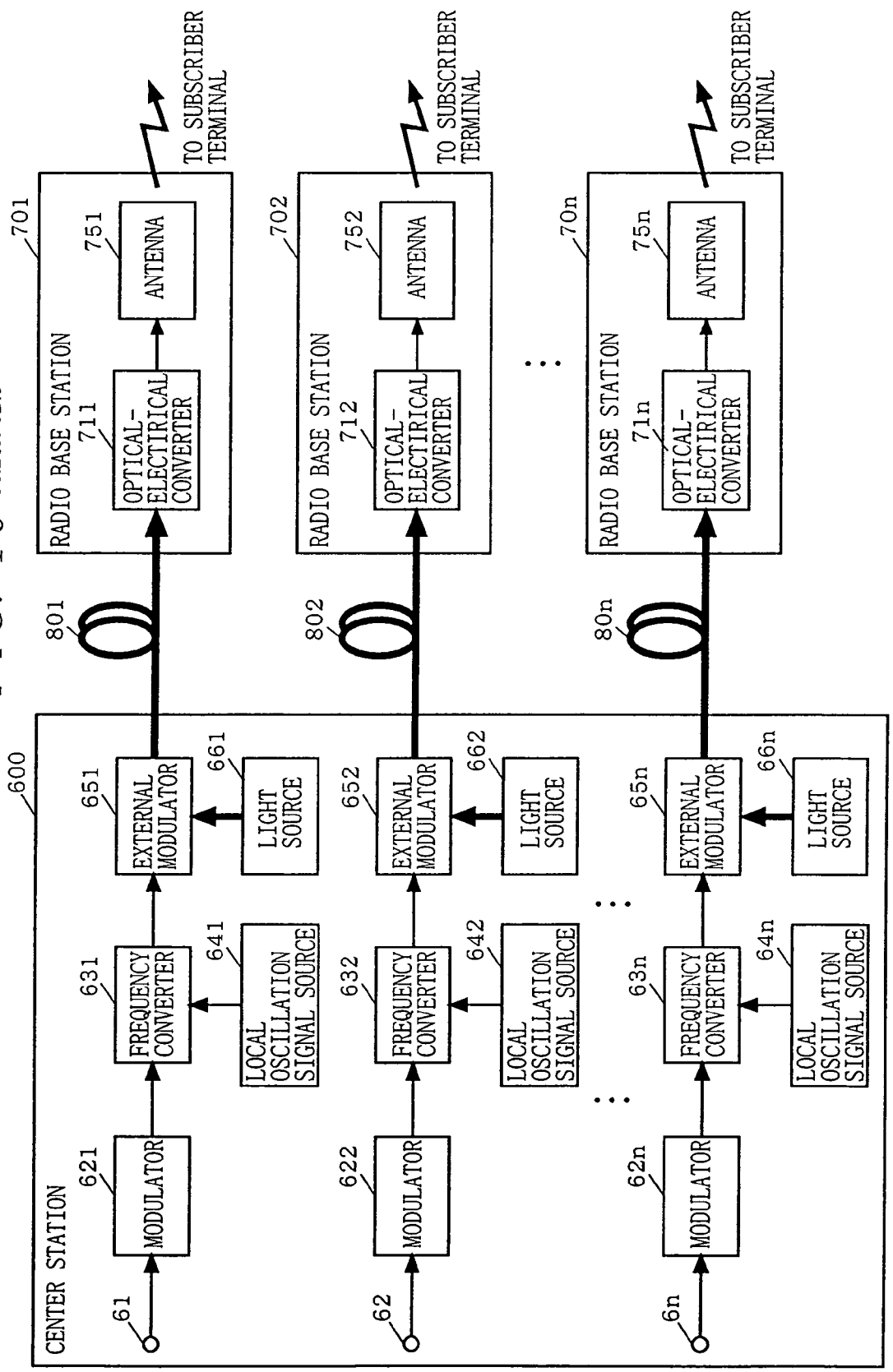
FIG. 19 is a block diagram showing the configuration of another conventional optical transmission system.

FIG. 16 is a block diagram showing the configuration of a high frequency optical transmitter according to an eighth embodiment of the present invention. In FIG. 16, the high frequency optical transmitter according to the eighth embodiment includes a two-branching portion 575, an electrical-optical converter 540, a delay controller 525, a local oscillation signal source 560, and a phase modulator 581 and an intensity modulator 582 constituting an integrated modulator 580. The operation of the high frequency optical transmitter according to the eighth embodiment of the present invention will be described.

An IF signal inputted from an IF input terminal 51 is branched into first and second IF signals having a phase difference of 90° therebetween in the two-branching portion 575. The first IF signal and the second IF signal are respectively inputted to the electrical-optical converter 540 and the delay controller 525. The first IF signal is converted into an optical signal by direct modulation in the electrical-optical converter 540, and the optical signal is outputted to the phase modulator 581. The second IF signal is inputted to an optical waveguide of the phase modulator 581 through the delay controller 525. A time period $\tau 3$ elapsed from the time when the first IF signal is outputted from the two-branching portion 575 until it propagates to the phase modulator 581 after being converted into the optical signal in the electrical-optical converter 540 and a time period $\tau 4$ elapsed from the time when the second IF signal is outputted from the two-branching portion 575 until it is modulated in the phase modulator 581 are made equal to each other, thereby making it possible to reduce a light frequency modulation component caused at the time of direct modulation.

Generally, the amount of transmission delay is found by measuring the level of the inputted signal and the level of the received signal. In a case where the electric signal is phase-modulated by the phase modulator 581, even if the optical signal is converted into the electric signal on the side of light receiving, no electric signal component is obtained. Accordingly, the amount of transmission delay cannot be measured.

Therefore, the integrated modulator 580 constructed by integrating the phase modulator 581 and the intensity modulator 582 is used to measure an amount of transmission delay $\tau 4'$ in a case where an IF signal is inputted to the intensity modulator 582 and is transmitted by intensity modulation. On the basis of the results, the amount of delay of the delay controller 525 is first coarsely adjusted such that $\tau 3 = \tau 4'$. Thereafter, the amount of delay of the delay controller 525 may be precisely adjusted such that the light frequency modulation component is the minimum by inputting the IF signal which has been inputted to the intensity modulator 582 again to the phase modulator 581 to which the IF signal is to be inherently inputted, and measuring a light spectrum of the IF signal which has been subjected to direct modulation in the electrical-optical converter 540 and phase modulation in the phase modulator 581 using a light heterodyne method, for example.

The eighth embodiment is superior to the seventh embodiment in that a loss to the local oscillation signal may be small because it can be directly applied to the intensity modulator 582 without passing through a multiplexer or the like.

As described above, in the high frequency optical transmitter according to the eighth embodiment of the present invention, the phase modulator 581 and the intensity modulator 582 are integrated in the integrated modulator 580, thereby making it possible to easily make delay adjustment for canceling the light frequency modulation component. Further, a light phase modulating operation for directly inputting the IF signal and the local oscillation signal, respectively, to the phase modulator and the intensity modulator without multiplexing the signals to suppress a light frequency component caused at the time of direct modulation and a light-intensity modulating operation for frequency conversion using the local oscillation signal are performed, thereby making it possible to reduce a loss to each of the signals and to perform optical modulation more efficiently.

Although in the above-mentioned seventh and eighth embodiments, description was made of a case where the high frequency optical transmitter is applied to such a configuration that information is transmitted in a downstream direction from the center station to the subscriber terminals, the high frequency optical transmitter is also similarly applicable to such a configuration that information is transmitted in an upstream direction from the subscriber terminals to the center station 100.

While the invention has been described in detail, the foregoing description is in all aspects illustrative and not restrictive. It is understood that numerous other modifications and variations can be devised without departing from the scope of the invention.

What is claimed is:

1. An optical transmission system comprising:
   a center station; and
   a plurality of radio base stations connected to the center station with a plurality of optical fibers, the plurality of radio base stations covering different service areas,
   wherein said center station includes:
   a light source for outputting predetermined light;
   a local oscillation signal source for outputting a predetermined local oscillation signal;
   an external modulation portion for intensity-modulating the light outputted from said light source using the local oscillation signal outputted from said local oscillation signal source;
   an optical branching portion for branching an optical signal obtained by the intensity-modulating in said external modulation portion into a plurality of optical signals whose number corresponds to a number of said plurality of radio base stations; and
   a plurality of IF modulation portions, which are provided so as to correspond to said plurality of radio base stations, each for intensity-modulating a respective one of the plurality of optical signals obtained by the branching in said optical branching portion using an inputted electric signal, and outputting the intensity-modulated optical signal to a respective one of the plurality of optical fibers, and
   wherein the electric signal inputted to each of the plurality of IF modulation portions is one or more IF signals in which one or more baseband signals are modulated by different predetermined intermediate frequencies respectively,
   wherein each of said plurality of IF modulation portions intensity-modulates the respective optical signal such that only an IF signal component used in a service area covered by a corresponding radio base station is transmitted, and
   wherein said plurality of radio base stations each includes:
   an antenna portion for transmitting and receiving radio signals to a subscriber terminal; and
   at least an optical-electrical conversion portion for converting the corresponding one of the optical signals transmitted through the plurality of optical fibers into an electric signal in a radio frequency band, and feeding the converted electric signal to said antenna portion without passing the converted electric signal through a filter.

* * * * *